(12) United States Patent
Parrish

(10) Patent No.: US 6,907,694 B2
(45) Date of Patent: Jun. 21, 2005

(54) SUPPORT STRUCTURE FOR TRELLIS SYSTEM

(75) Inventor: David Parrish, Visalia, CA (US)

(73) Assignee: A&P Ag Structures, Inc., Visalia, CA (US)

( * ) Notice: Subject to any disclaimer, the term of this patent is extended or adjusted under 35 U.S.C. 154(b) by 0 days.

(21) Appl. No.: 10/121,554

(22) Filed: Apr. 12, 2002

(65) Prior Publication Data

US 2003/0101642 A1 Jun. 5, 2003

Related U.S. Application Data

(60) Provisional application No. 60/338,537, filed on Nov. 30, 2001.

(51) Int. Cl.$^7$ .................................................. A01G 9/12
(52) U.S. Cl. .................. 47/70; 47/46; 47/47; 47/41.14; 47/44; 248/27.8
(58) Field of Search ............................... 47/46, 44, 47, 47/41.14, 70; 248/27.8

(56) References Cited

U.S. PATENT DOCUMENTS

| | | | |
|---|---|---|---|
| 156,097 A | 10/1874 | McDonald | |
| 941,894 A | 11/1909 | Stetson | |
| 3,526,993 A | 9/1970 | Siebol | |
| 3,546,856 A | 12/1970 | Hiyama | |
| 3,585,756 A | 6/1971 | Johnson | |
| 3,690,033 A | 9/1972 | Lewis et al. | |
| 4,336,667 A | 6/1982 | Evans | |
| 4,480,402 A | 11/1984 | Hiyama et al. | |
| 4,738,051 A * | 4/1988 | Dyson ............................ | 47/46 |
| 5,063,709 A * | 11/1991 | Whittaker ........................ | 47/46 |
| 5,144,768 A | 9/1992 | Hiyama et al. | |
| 5,337,514 A | 8/1994 | Hiyama et al. | |
| 5,411,561 A | 5/1995 | Conley | |
| 5,557,883 A * | 9/1996 | Walker ........................... | 47/46 |
| 5,630,292 A | 5/1997 | Heinz et al. | |
| 5,711,109 A | 1/1998 | Pitts | |
| 5,797,214 A | 8/1998 | Parrish | |
| 6,138,407 A * | 10/2000 | Pierce ........................... | 47/46 |
| 6,145,246 A | 11/2000 | Galbraith | |
| 6,293,521 B1 | 9/2001 | Parrish | |
| 6,378,245 B1 | 4/2002 | Summers | |

FOREIGN PATENT DOCUMENTS

FR 2552622 * 9/1983 .......... A01G/17/14

OTHER PUBLICATIONS

"Alternating Duplex: A Vine Training System for Mechanized Raisin Production" H.E. Studer 4 pgs 1984.
Mechanization of Raisin Production with the Irymple Trellis System, I.V. Gould and J.R. Whiting 5 pgs 1987.
"The Shaw Trellis", Hayes. 5 pgs.

* cited by examiner

Primary Examiner—Peter M. Poon
Assistant Examiner—Andrea M. Valenti
(74) Attorney, Agent, or Firm—Mark D. Miller

(57) ABSTRACT

A new trellis support structure and a method for its production for use in supporting vine borne crops. The support structure includes a metallic support member that is bent into a modified U-shape and attached to a metallic cross arm using a process that produces consistent results. The combination of the U-shaped member and cross arm is then attached to a vertical support post at two different locations: one attachment at the center of the U-shaped member, and the other attachment at the center of the cross arm in an axial alignment with the support post. The structure is extremely strong, capable of supporting considerable weight, not likely to shift, and less prone to failure from fatigue. The support structure is produced by first bending the central section of a metallic support member into a U-shape, placing the bent member on a specially designed adjustable jig, and attaching a cross arm. This assembly is then attached to a support post in two places preventing pivotal rotation of the combined structure once it is mounted to the support post.

23 Claims, 28 Drawing Sheets

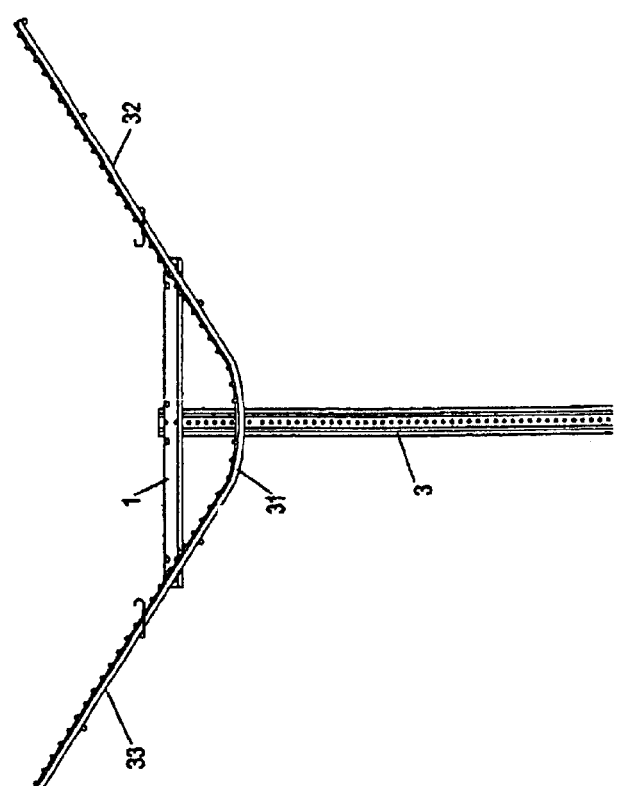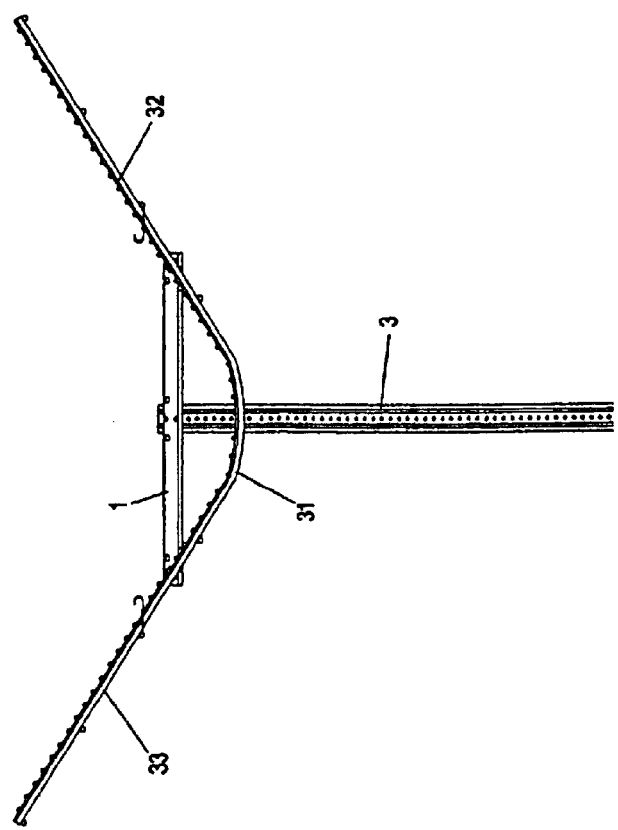
FIG. 12

SUPPORT STRUCTURE FOR TRELLIS SYSTEM

This application claims benefit of application Ser. No. 60/338,537 filed on Nov. 30, 2001, which is incorporated herein by this reference.

BACKGROUND OF THE INVENTION

1. Field of the Invention

The present invention relates to structures used to support growing crops, and more particularly to the combination of an improved cross arm and bent trellis support member for use in a trellis structure to support vine borne crops.

2. Description of the Prior Art

Various trellis structures are widely used in the training and support of commercial crops. A typical commercial agricultural grape vineyard is made up of a plurality of parallel rows of growing plants. In order to train the growth of the plants and to support the plants and the crops they bear, a plurality of upright support structures are typically deployed in parallel in the rows with the plants, the structures supporting a plurality of wires strung from one end of each row to the other. A typical support structure includes a vertical post having one end buried in the ground, and a cross member attached at the other end. The support wires are typically attached to the cross members of the parallel support structures.

Existing trellis structures suffer from a number of common deficiencies including, most notably, the great expense of the support structures themselves, as well as the high cost of installing and maintaining the trellis system in a field. Each support structure includes at least one vertical post, at least one cross member, a means for attaching the cross member to the post, and various means for attaching the plurality of parallel support wires to the cross member(s). Hundreds of each of these parts are required for each acre of ground upon which the trellis system is installed. The installation process is complex, involving precise positioning of the support structures and wires, requiring specially trained and more costly labor for proper installation. After installation, there are continuing costs associated with maintaining and adjusting the tension of the wires and the positions of the support structures on a regular basis, particularly as the weight on the system is increased due to plant growth and the weight of annual crops.

Depending upon the plants to be supported by the trellis structure, it is often desirable to provide support arms that are angled with respect to each other and with respect to the surface of the field, as opposed to flat horizontal arms. By selecting an appropriate angle for the support arms, sunlight and airflow around the plants may be optimized, and harvesting may be simplified. However, such angled support arms are generally formed from inexpensive T-stakes (T-posts) which are notorious for inconsistencies and lack of lateral straightness, resulting in inconsistencies from one support structure to the next in a field. This leads to an inconsistent appearance in the field, potentially inconsistent crop support, and increased maintenance costs.

In addition to being expensive, trellis structures are continuously subjected to the rigors of their outdoor environment. Wind, rain, frost, snow, heat, cold and other environmental factors, as well as such agricultural practices as training, growing, pruning and harvesting performed on the plants all take a toll on the support structures, wires, attachment means, and other parts of the trellis structures. The more elaborate the design of the trellis system, the more significant and expensive these factors can be.

U.S. Pat. No. 5,630,292 describes a trellis structure having a support post that it attached to a cross member that has been bent into a V-shape using a specially designed coupling to form a Y-shaped support. This structure suffers from several drawbacks including significant stress on the central V-bend in the cross member from the great weight of the plants and crops supported. Because of this weight, the single V-shaped member is susceptible to fatigue and early failure. Moreover, the single central attachment coupling between the support post and the V-shaped cross member may act as a pivot, allowing the cross member to move relative to the post, resulting in cross members of adjacent supports to fall out of alignment with each other, thereby requiring frequent adjustments of the structures and the wires they support. The manufacturing of this trellis structure is prone to inconsistent production results that become apparent upon installation in the field, and the installation process itself is inefficient and subject to irregularities and inconsistencies.

It is therefore desirable to provide an inexpensive, durable and reliable trellis support structure for use in commercial agriculture that has minimal susceptibility to failure and that requires a minimal amount of post-installation maintenance. It is also desirable to provide a process for manufacturing trellis structures that provides a consistent end product so that each structure installed in a field has the same desired shape and configuration.

SUMMARY OF THE INVENTION

The present invention provides a new trellis support structure and a method for its production that is useful in commercial agriculture, particularly with vine borne crops such as grapevines. The support structure of the present invention includes a metallic support member that is bent into a modified U-shape and attached to a metallic cross arm using a process that produces consistent results. The combination of the U-shaped member and cross arm is then attached to a vertical support post at two different locations: one attachment at the bottom of the U of the U-shaped member, and the other attachment at the center of the cross arm in an axial alignment with the support post. The resulting structure has a resemblance to the symbol for Japanese currency (¥). The U-shape of the bent support member in combination with the attached cross arm provides for a more even distribution of weight and stress, as contrasted to the concentration of weight and stress at the apex of the V-shaped member in the prior art. The combination of the U-shaped member and cross arm is very strong, it is capable of supporting considerable weight, and it is less prone potential failure from fatigue. The length of the support member may be varied according to the number of wires to be supported. Similarly, the angle between the arms of the support member may be varied according to the desires of the grower, the particular plants to be supported, and the agricultural practices to be performed on the plants. The length of the cross member may be varied according to the angle between the arms and the position of the cross member relative to the arms. The cross member may also be used to support wires.

The structure of the present invention is produced by first bending the central section of a metallic support member (such as a studded T-post) into a U-shape using an appropriate hydraulic press or other suitable pressure imparting machine. The tools and settings used on the machine should be set so as to apply pressure broadly to the metallic member at its center to form the shape of a modified "U." The forming pressure is not applied to a single point that might otherwise form an undesirable "V." A broad, blunt tool shape is preferable, the width of the tool being selected according to the overall size of the metallic member to be bent, the desired angle between the resulting arms, and the length of the desired bow at the bottom of the "U." Only enough pressure to bend the metallic member into a modified "U" shape should be applied. The angle between the arms may be anywhere from 46° to 179° (i.e., each arm being raised from 1° to 67° from horizontal), preferably in a range of between 100° and 130° (i.e., each arm being raised from 25° to 40° from horizontal). Thereafter, the bent member, now having two angled arms, is placed on a specially designed jig. The jig has a plurality of adjustable guides that are pre-set according to the angle desired between the arms of the metallic member. Inserting the bent member into these guides assures that the arms meet the exact pre-set angle. Thereafter, a cross arm is attached between the two arms, one end to each arm. Attaching the cross arm locks in the angle of the arms, and prevents this angle from changing. The combined structure is then attached to a vertical support member, with an attachment at the center of the U, and another attachment at the center of the cross arm. This prevents pivotal rotation of the combined structure once it is mounted on the support post.

It is therefore a primary object of the present invention to provide a strong and reliable support structure for use in an agricultural trellis system having a support member in the shape of a modified "U" defining a pair of angled support arms, and a cross member attached to and extending between the support arms, in which the support member and cross arm are attached to a post.

It is also a primary object of the present invention to provide a method for consistently manufacturing a support structure for use in an agricultural trellis system having a support member in the shape of a modified "U" defining a pair of angled support arms, and a cross member attached to and extending between the support arms for attachment to a post.

It is another object of the present invention to provide a combination of a U-shaped support member and attached locking cross arm for use in agricultural trellis systems that is inexpensive to manufacture.

It is another object of the present invention to provide a combination of a U-shaped support member and attached locking cross arm for use in agricultural trellis systems that has a reduced number of overall parts and which may be easily manufactured and installed.

It is another object of the present invention to provide a combination of a U-shaped support member and attached locking cross arm for use in agricultural trellis systems that may be attached to a support post in such a way that it is not likely to shift or rotate and is therefore easier to maintain.

It is a further object of the present invention to provide a combination of a U-shaped support member and attached locking cross arm for use in agricultural trellis systems that may be attached to a support post that has long-term strength and durability, and capable of supporting substantial weight.

Additional objects of the invention will be apparent from the detailed descriptions and the claims herein.

BRIEF DESCRIPTION OF THE DRAWINGS

FIG. 12 is a side view illustrating two support structures of the present invention installed side by side on parallel agricultural crop rows.

FIG. 15A is a detailed close up view of the attachment of a cross arm to a bent T-stake shown in FIGS. 13 and 14.

FIG. 15B is a close up cross sectional view of the attachment of the cross arm and bent T-stake shown in FIG. 15A.

FIG. 16A is a detailed close up view of the attachment of a different cross arm to a bent T-stake as shown in FIG. 16.

DETAILED DESCRIPTION OF A PREFERRED EMBODIMENT

The trellis structure of the present invention will be described herein with reference to a commercial grape vineyard. However, it is to be understood that the present invention may be used in conjunction with any suitable plant or growing crop.

Turning now to the drawings, it is seen that the support structure of the present invention is generally indicated by the numerals 1, 2 and 3 in FIGS. 1–4. While the support structure of the present invention is adaptable for use in a wide variety of different environments, it is particularly well suited to large scale commercial farming operations where the commercial crops are grown in rows and require segregation of certain portions thereof in the training, pruning, management and harvesting of the crops before, during and after the growing seasons. One such environment is in management, harvesting and other crop husbandry practices required in the commercial farming of grapevines. The support apparatus of the present invention is particularly well suited to such farming of grapevines and, therefore, will be described in this operative environment. It is to be understood, of course, that the invention is not limited to use with grapevines, but may be used with a variety of other plants including without limitation kiwis, and others. For illustrative convenience, the grapevines are not shown so as to leave fully visible the support structure of the present invention.

Figure 1:
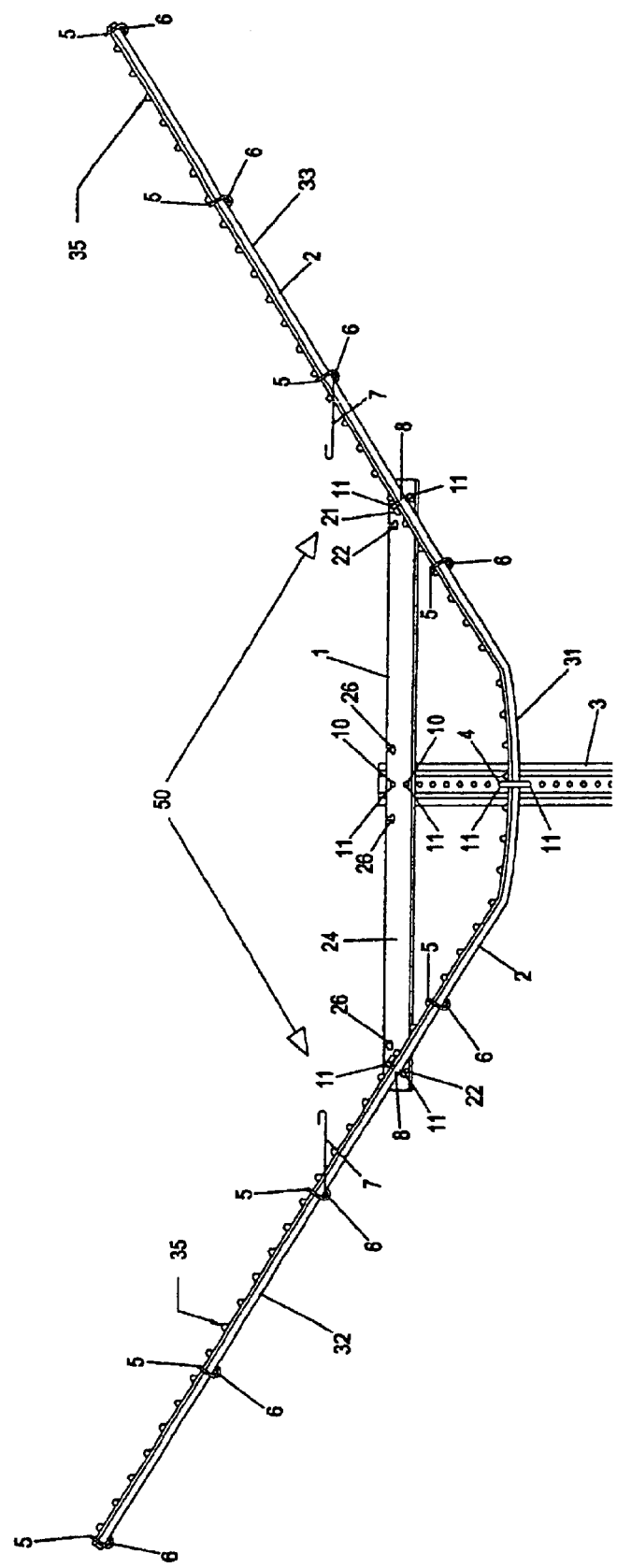
FIG. 1 is a side view of a first embodiment of the present invention.
Figure 5:
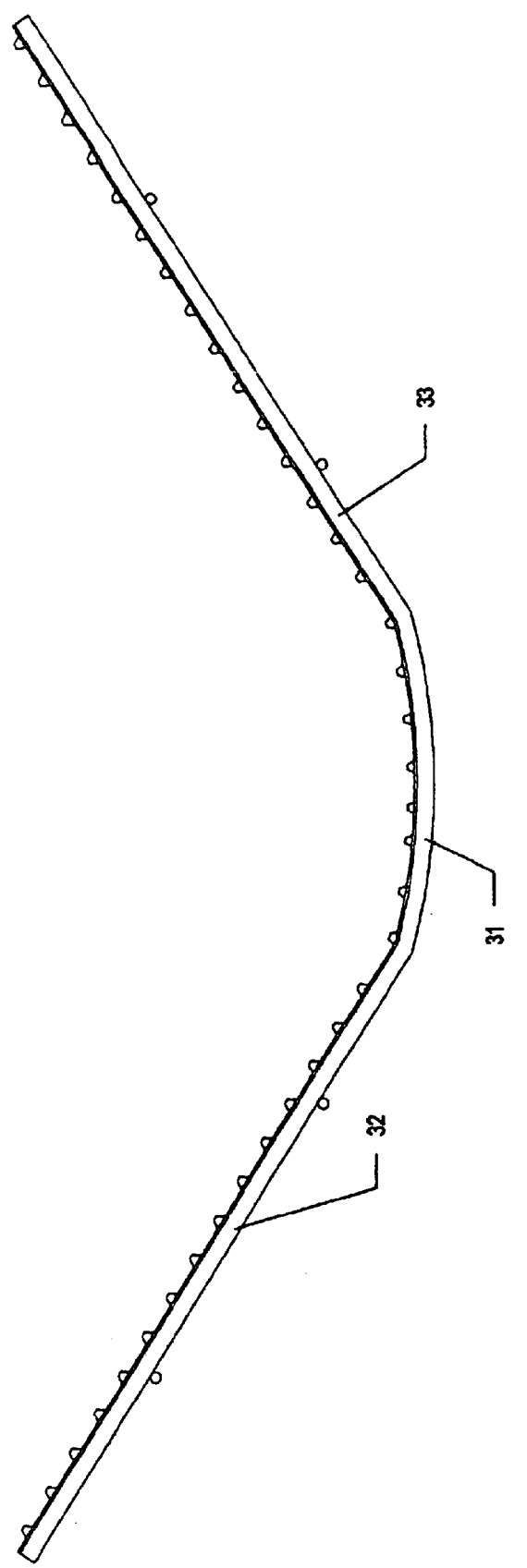
FIG. 5 is an enlarged side view a bent support member of the present invention.
Figure 6:
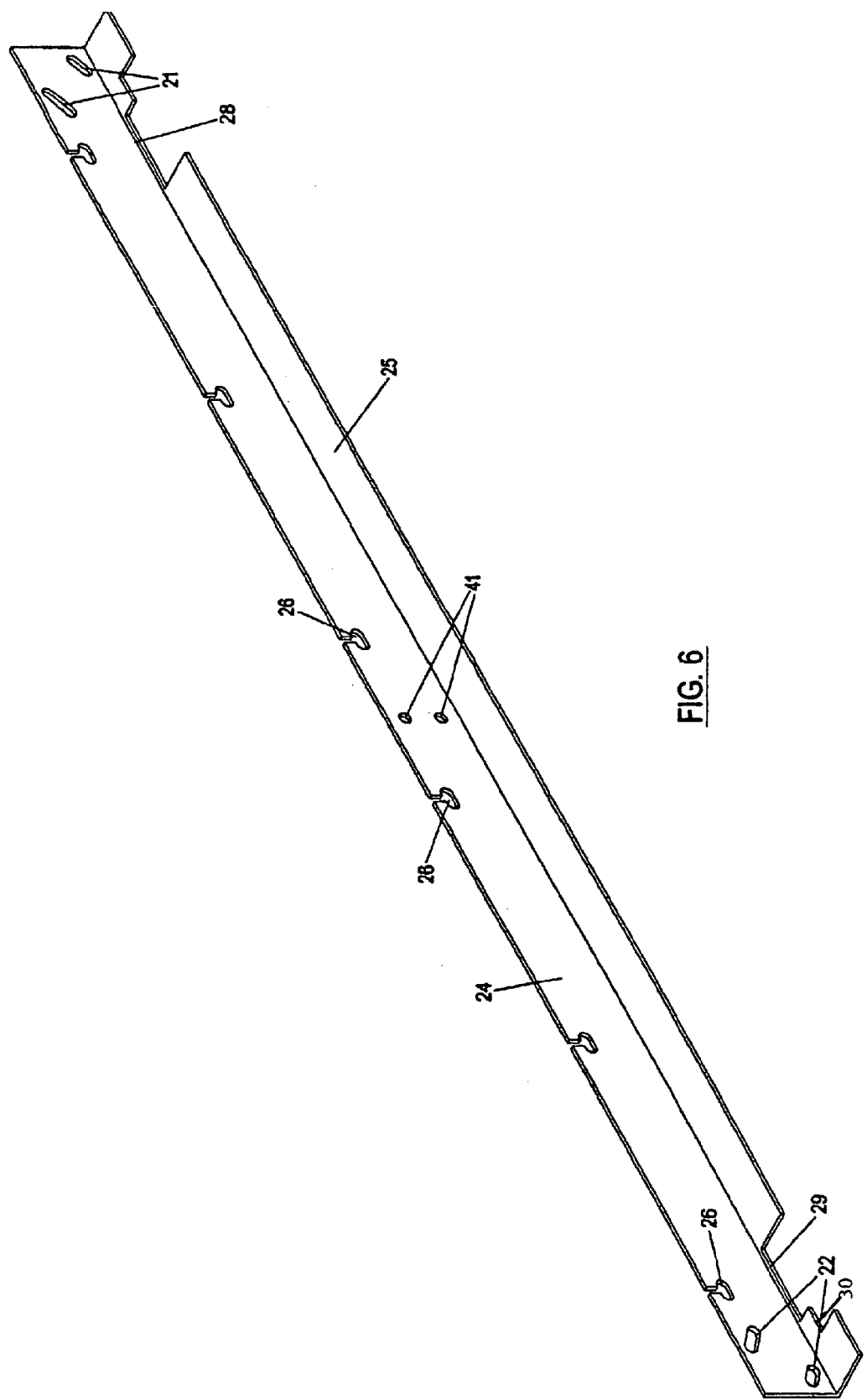
FIG. 6 is a perspective view of a first embodiment of a cross arm for the present invention.
Figure 7:
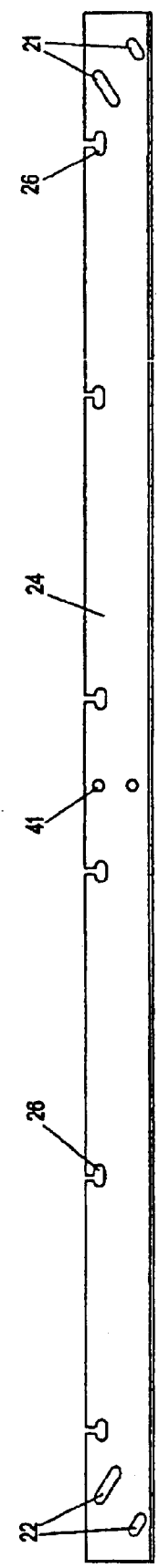
FIG. 7 is a side elevational view of the cross arm of FIG. 6.
Figure 8:
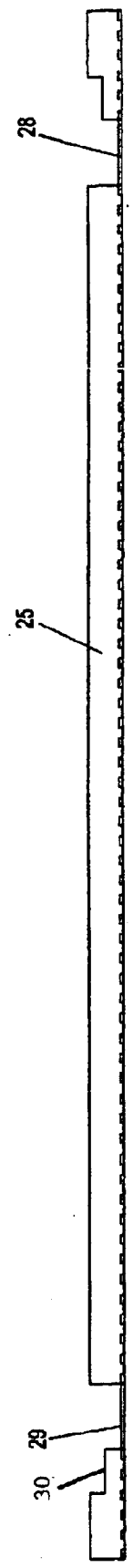
FIG. 8 is a top plan view of the cross arm of FIG. 6.
Figure 9:
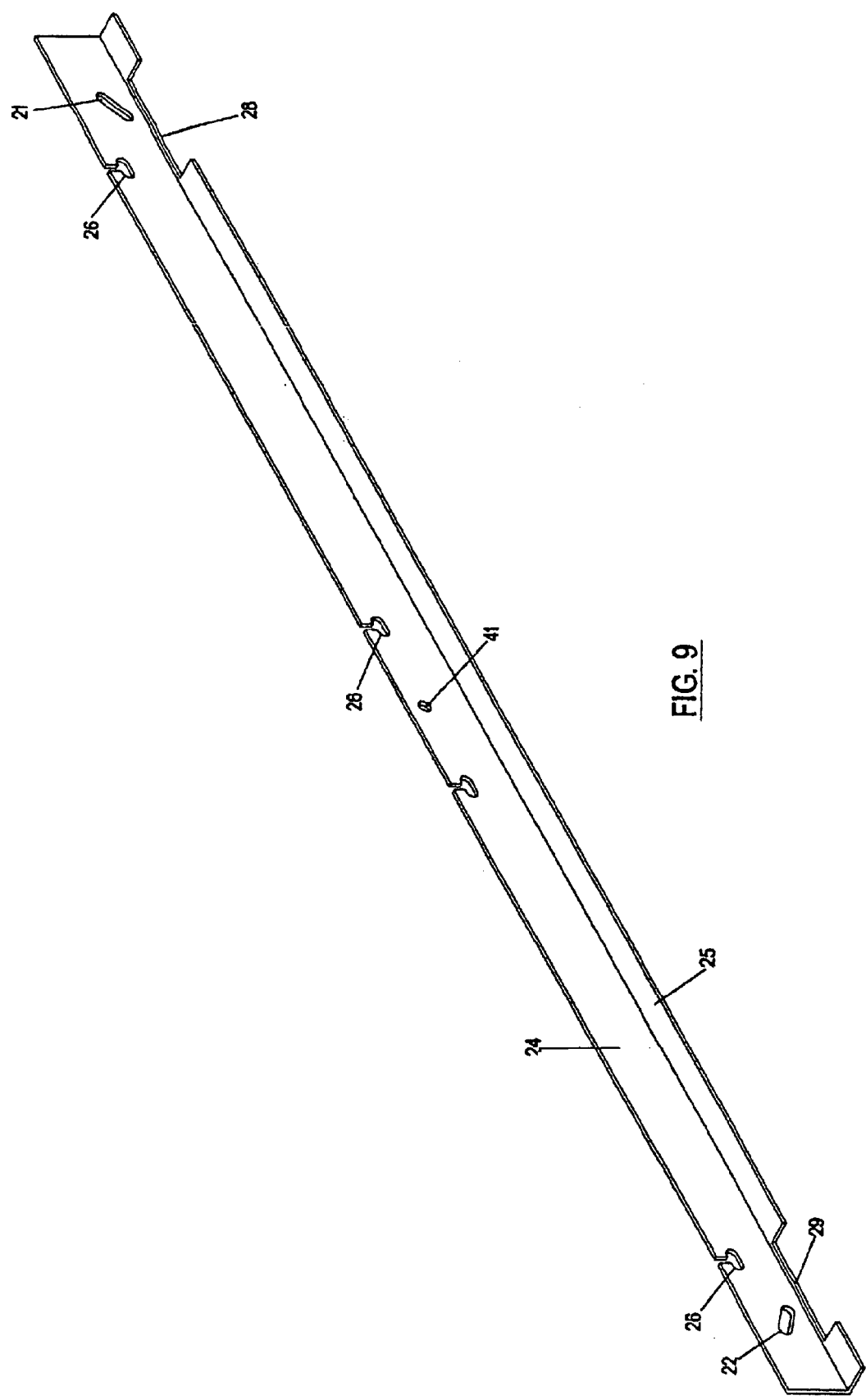
FIG. 9 is a perspective view of a second embodiment of a cross arm for the present invention.
Figure 10:
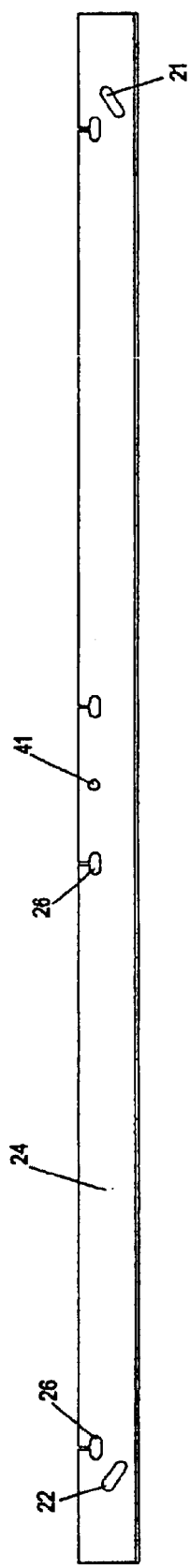
FIG. 10 is a side elevational view of the cross arm of FIG. 9.
Figure 11:
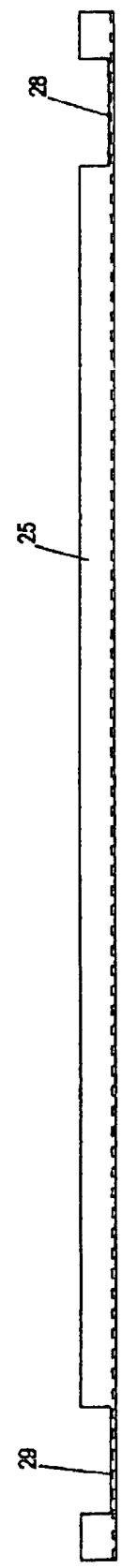
FIG. 11 is a top plan view of the cross arm of FIG. 9.
Figure 13:
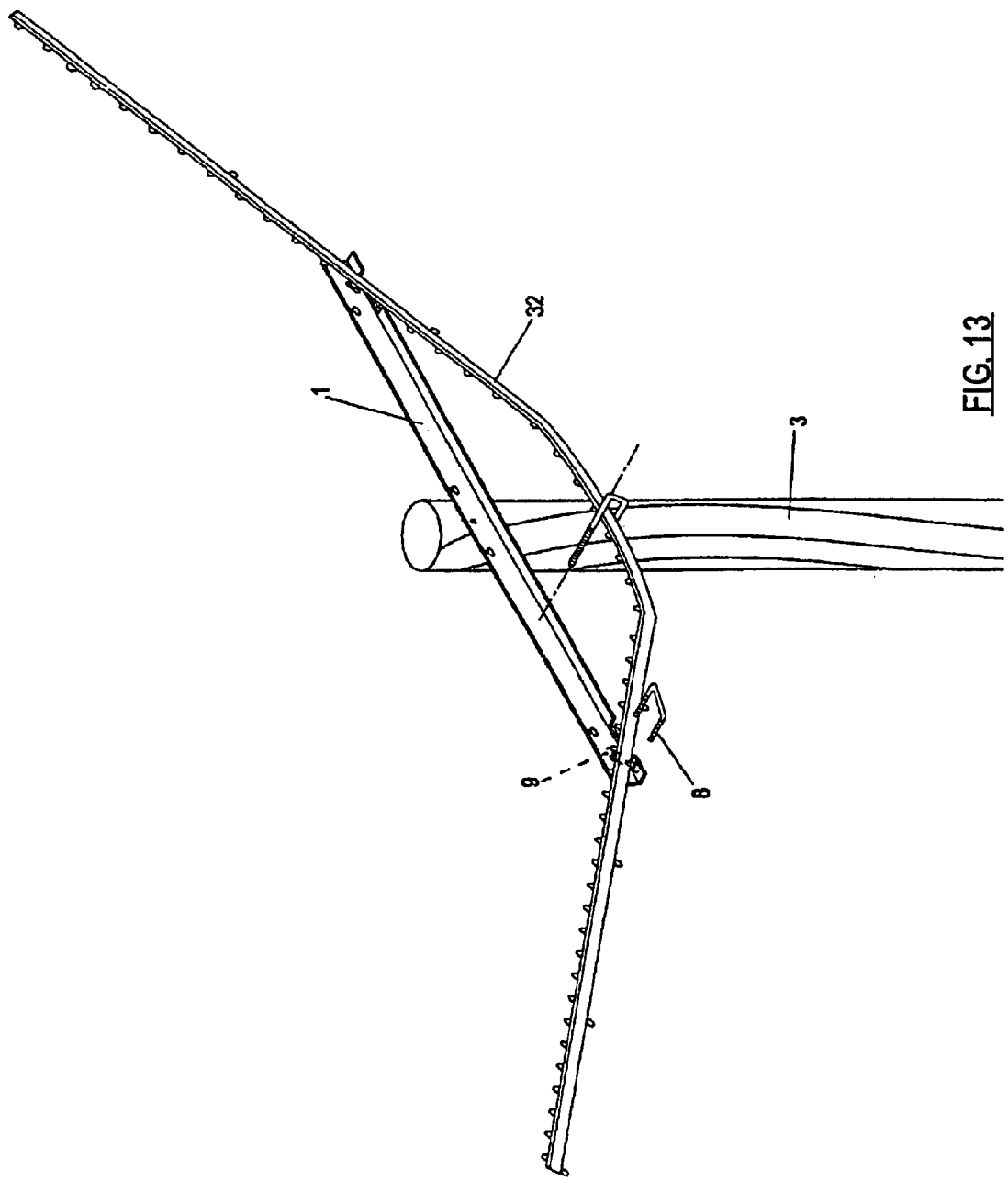
FIG. 13 is a perspective view of the support structure of the present invention installed on a wooden post.
Figure 14:
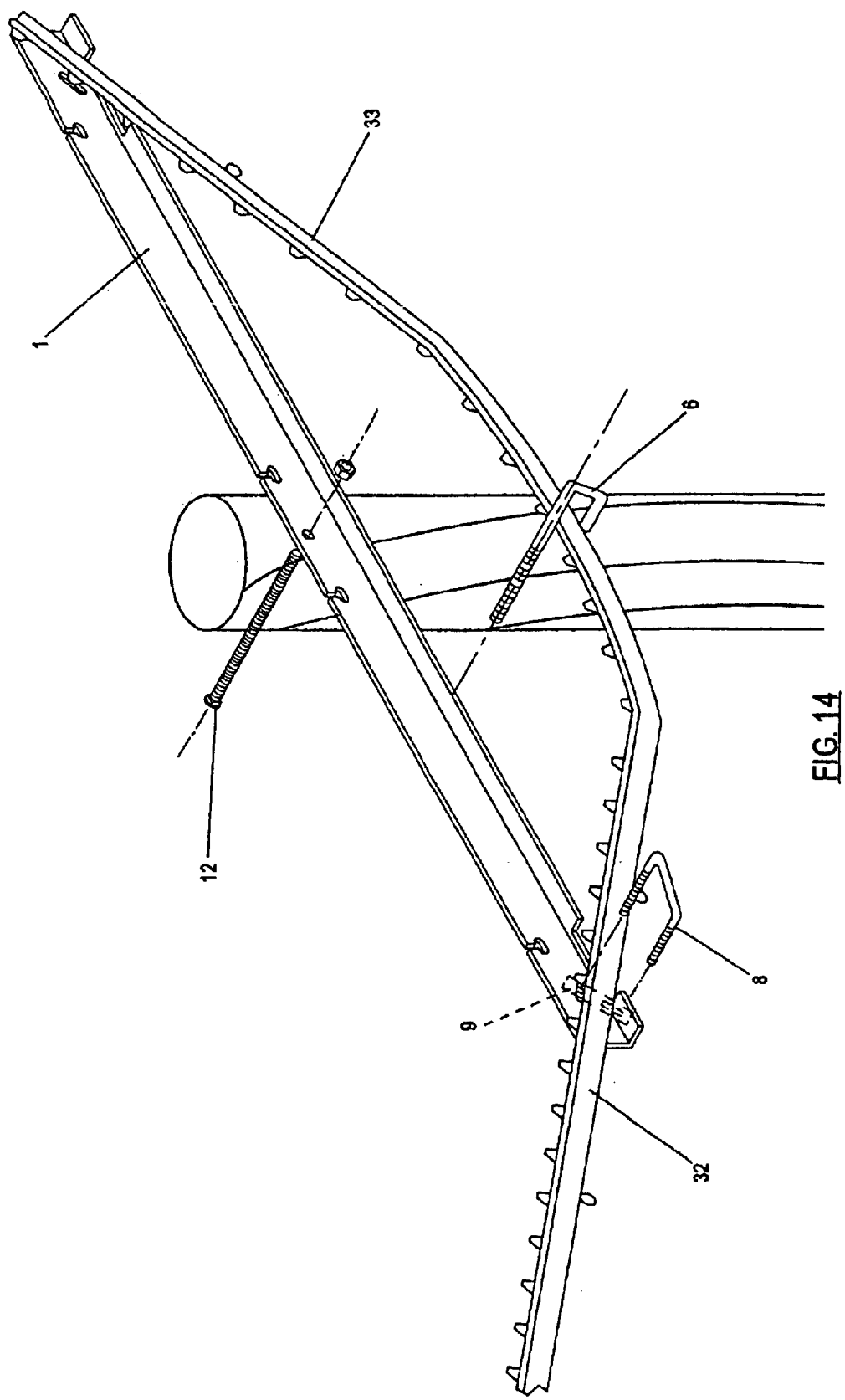
FIG. 14 is a detailed view of FIG. 13.

Referring specifically to FIGS. 1 and 5, it is seen that the support structure of the present invention includes a support member 2 having a central portion 31 that has been bent, creating two upwardly angled arms 32 and 33. The bent central portion 31 is straight or slightly arcuate, and establishes the bottom of a wide "U" shape made up of central portion 31 and arms 32 and 33. Arms 32 and 33 extend laterally away from the central portion 31 at an angle.

Support member 2 is made from a single elongated metallic member such as a studded T-stake (T-post), commonly used in metal fencing, or another similar material. For purposes of this discussion, the support member will be referred to as a bent T-stake, it being understood that other similar metallic materials could also be used. The cross sections of such stakes are generally in the form of a "T." Studded T-stakes are in plentiful supply and available at nominal cost and can be cut to any desired length. The T-stake has a plurality of protrusions, or studs, 35 mounted on and extending upwardly from the upper surface thereof.

Support member 2 is formed by first cutting the T-stake to a desired length, and then determining the angle 50 that is to be established between arms 32 and 33 when the T-stake is bent to form them. Tooling and settings which correspond to the desired angle are then established on an appropriate pressure-imparting machine such as a hydraulic press. The main bending tool has a broad surface in order to impart pressure to a central section of member 2 to form the central portion 31. The arms 32 and 33 are formed at the edges of the main bending tool working in conjunction with other tooling. The downward pressure from the main tool forms the central portion 31, and the resistance from the other tooling on either side of the main tool causes the portions of member 2 outside the central portion 31 to bend upward, forming arms 32 and 33. The resulting form is shown in detail in FIG. 5. This process is repeated for each member 2 to be formed.

After the machine bending, member 2 is then placed into a forming jig. The jig may be of any suitable type, the preferred embodiment being a flat table having adjustable guides. The positions of the guides are established according to the selected angle between arms 32 and 33. The machine bending of member 2 will generally establish this angle, but there will inevitably be some variations of one or more degrees caused by different factors such as the metallic composition of the member, its length, temperature, humidity, tooling variations, operator error, and the like. Placement of the bent member 2 into the guides on the jig forces member 2 to conform to the selected angle. At this point, a locking cross arm 1 is attached to member 2 between arms 32 and 33. The attachment of cross arm 1 to arms 32 and 33 fixes their positions, and fixes the angle between them. The simple act of placing every bent member 2 into a jig having guides set at the same settings, and thereafter attaching the locking cross arm 1 to arms 32 and 33, results in the production of strong support structures consistently having the same angle and shape every time. The cross arm 1 adds structural support and stability by triangulation between the cross arm 1 and the bent member 2. The increase of stability and added strength allows the structure to carry more weight than a simple bent T-stake having no horizontal cross arm support.

Figure 2:
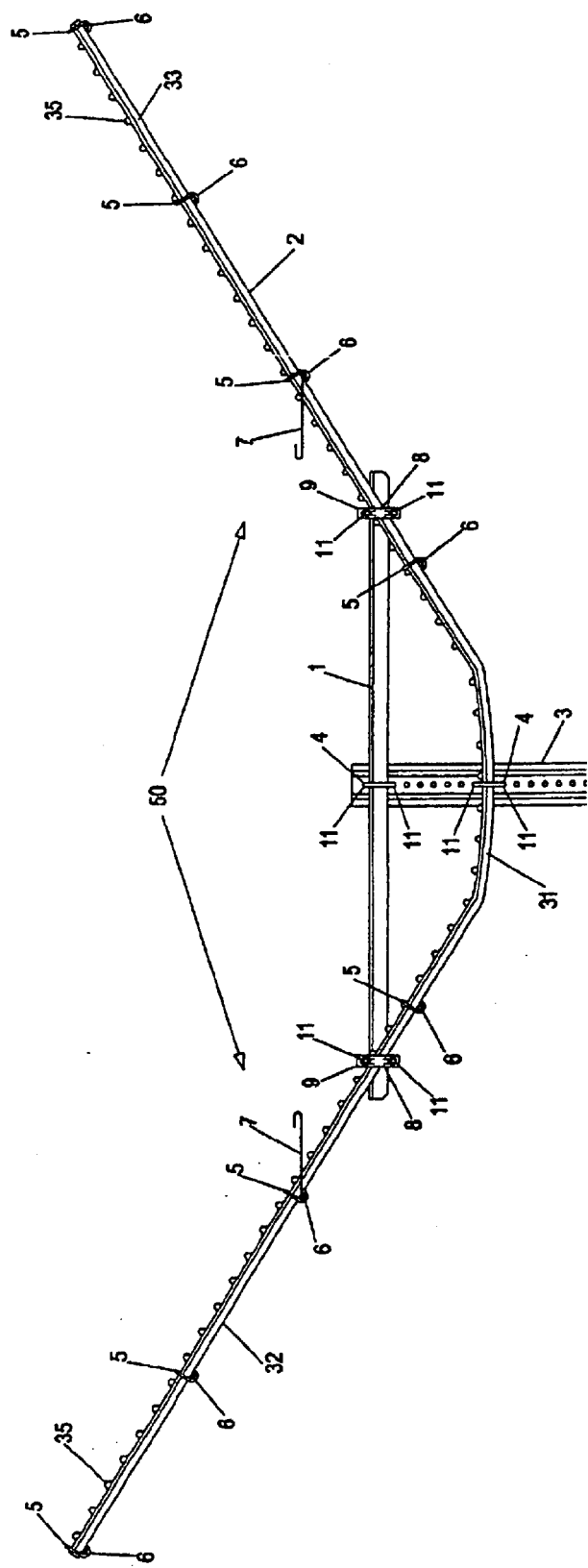
FIG. 2 is a side view of a second embodiment of the present invention.
Figure 3:
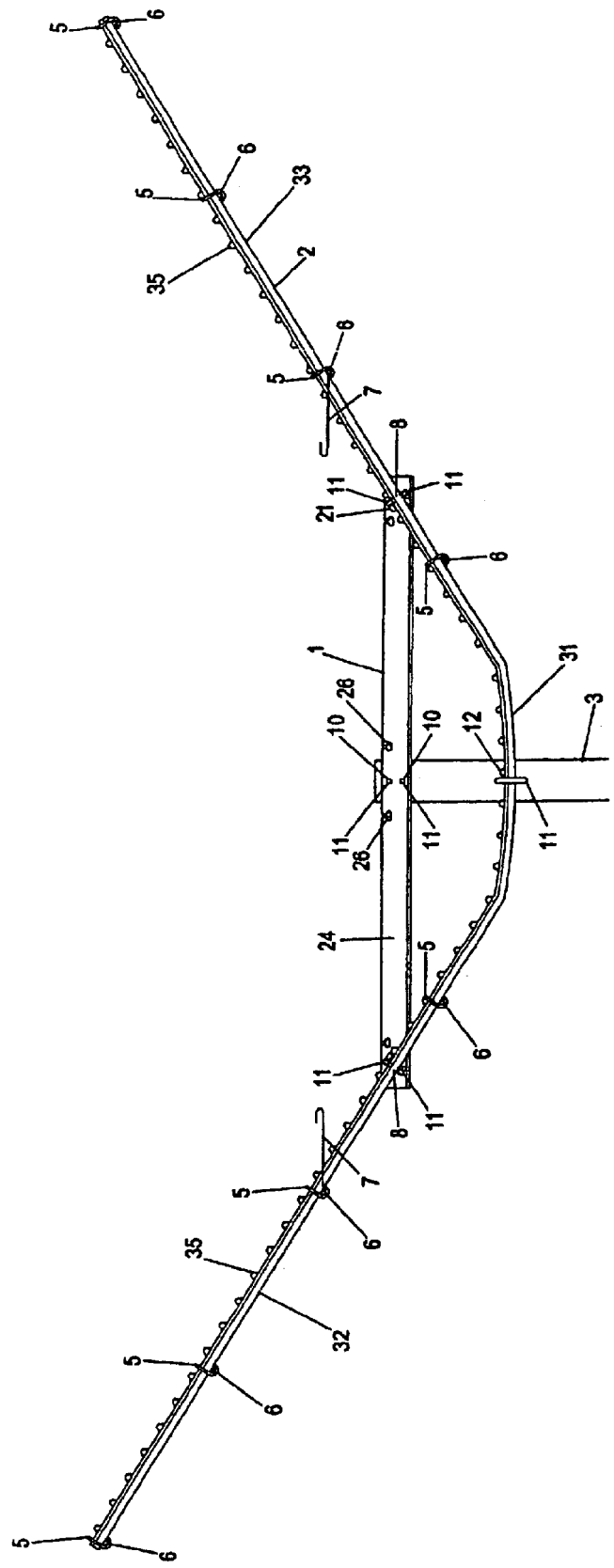
FIG. 3 is a side view of a third embodiment of the present invention.
Figure 4:
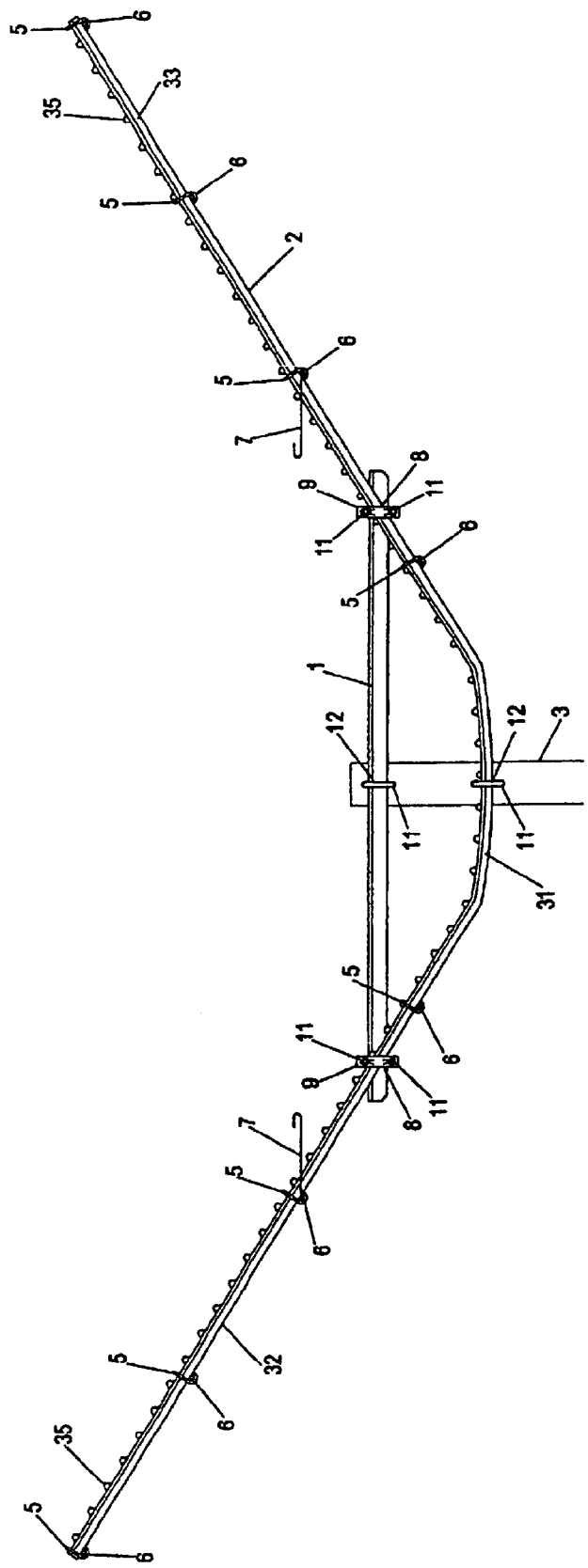
FIG. 4 is a side view of a fourth embodiment of the present invention.

Cross arm 1 is preferably made of angled steel (as shown in FIGS. 1, 3, and 6–11), or a T-stake (as shown in FIGS. 2 and 4), but may also be made of another metal, rigid plastic, wood, or any other suitable durable material. Referring to the detail of FIGS. 6–8, it is seen that cross arm 1 is in the form of a bracket having an L-shaped cross section including a first flanged edge 24 and a perpendicularly attached flanged edge 25. Two pairs of openings 21 and 22 are provided at each end of cross arm 1 on flange 24. The two openings of each pair are provided in parallel to each other, and at an angle corresponding to the angle of bent arms 32 and 33, respectively. These angles will be different depending upon the selected angle of arms 32 and 33. The openings of each pair 21 and 22 are slightly elongated in order to accommodate appropriate devices 8 for anchoring the cross arm 1 to support arms 32 and 33. In addition, a section 28 with stair-step segment 30 is cut out of flange 25 in the vicinity of openings 21, and a similar section 29 with stair-step segment 30 is cut out of flange 25 in the vicinity of openings 22. The positions of cut out sections 28 and 29 on flange 25 will also depend upon the angle of arms 32 and 33. In a simpler alternative embodiment shown in FIGS. 9–11, single openings 21 and 22 are provided at opposite ends of flange 24, and larger un-segmented sections 28, 29 are cut into flange 25. The weight of the plants and crops supported by arms 32 and 33 is transferred directly to cross arm 1 through the engagement of sections 28 and 29 with arms 33 and 32, respectively.

Figure 15:
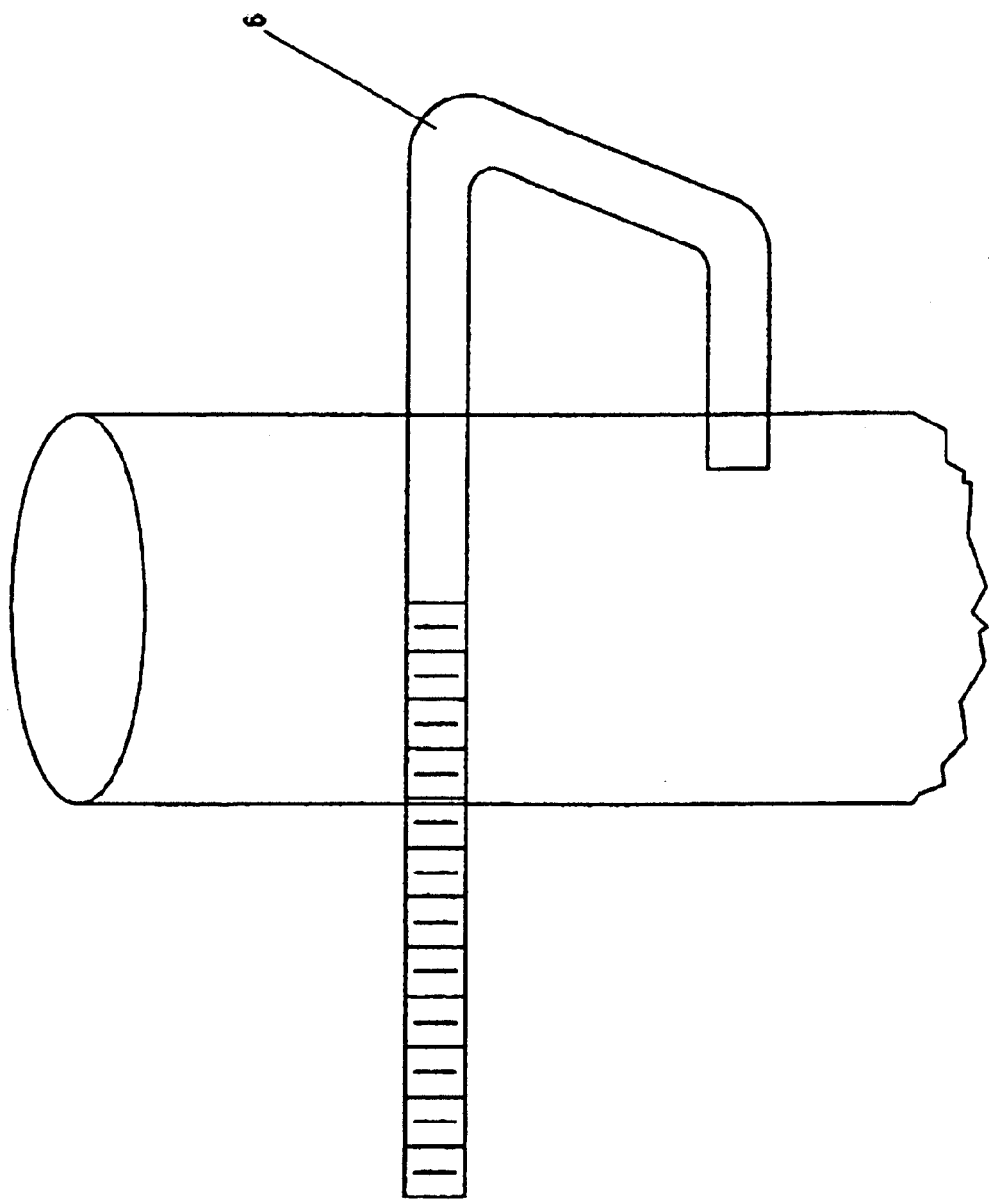
FIG. 15 is a detail view of the wood post attachment bolt.
Figure 15:
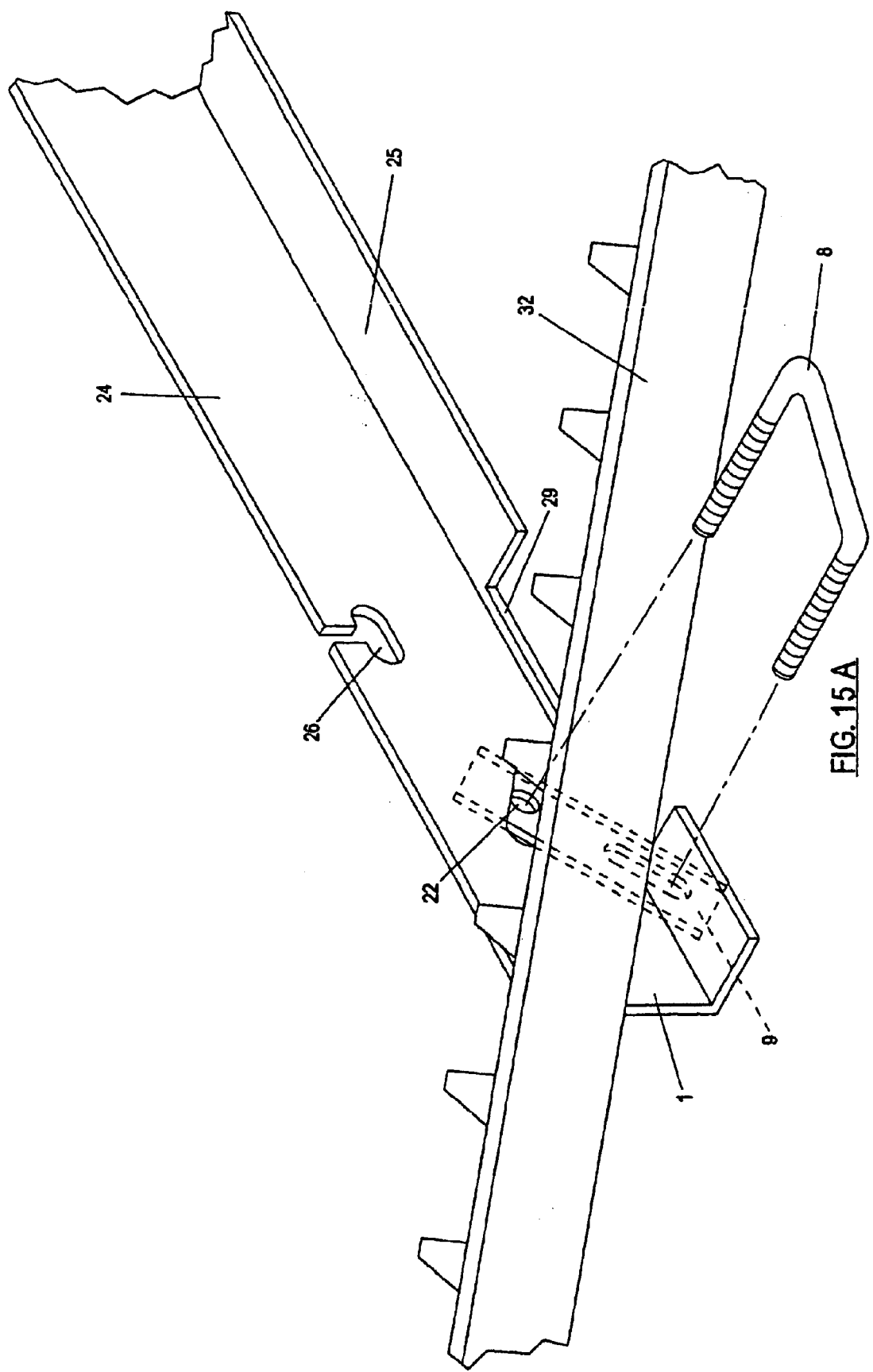
Figure 15:
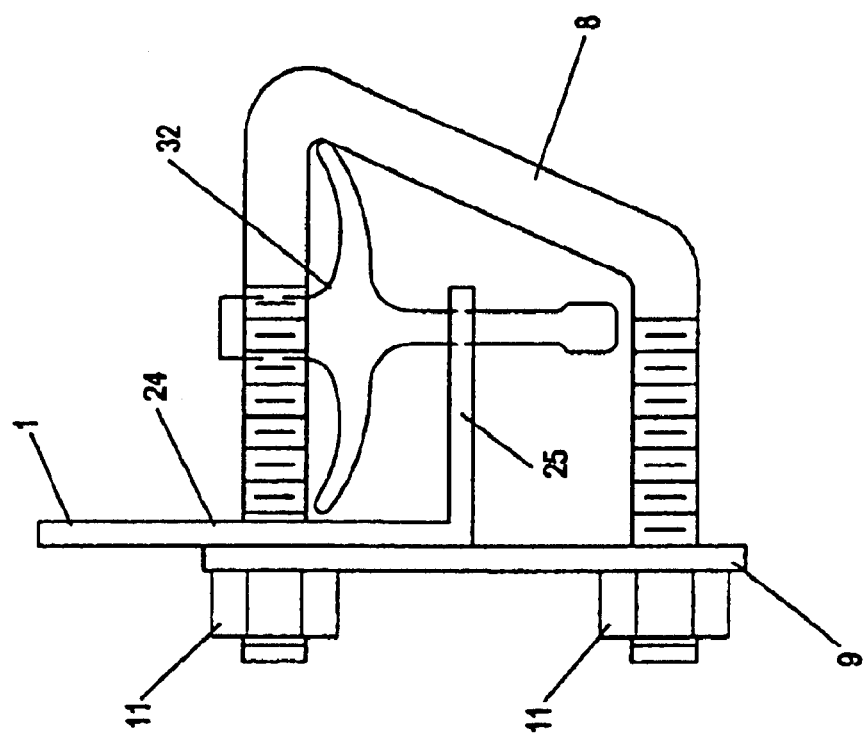

In the embodiment of FIGS. 1 and 3, cross arm 1 is in the form of a steel member having an L-shaped cross section. Attachment of the simpler form of cross arm 1 (shown in FIGS. 9–11) is accomplished by aligning cut out sections 28 and 29 with arms 33 and 32, respectively, of bent member 2 as shown in the detail of FIG. 15A. Anchors 8 are then used in conjunction with back plates 9 to attach cross arm 1 to bent member 2. Anchors 8 are in the preferred form of U-bolts, however any suitable anchor may be used. Bent member 2 is placed on the jig, and cross arm 1 is fitted into place with flange 24 lying flat against the arms of member 2, and flange 25 extending perpendicularly such that arm 32 extends through cut out section 29, and arm 33 extends through cut out section 28. Then, each U-bolt 8 is attached around its respective arm (32 or 33), and passed through its respective pair of openings (21 or 22). The ends of U-bolts 8 are then fastened to cross arm 1 using nuts 11, with back plates 9 as shown in FIGS. 15 and 15A. Once the nuts are tightened, the assembled unit may be removed from the jig.

Figure 16:
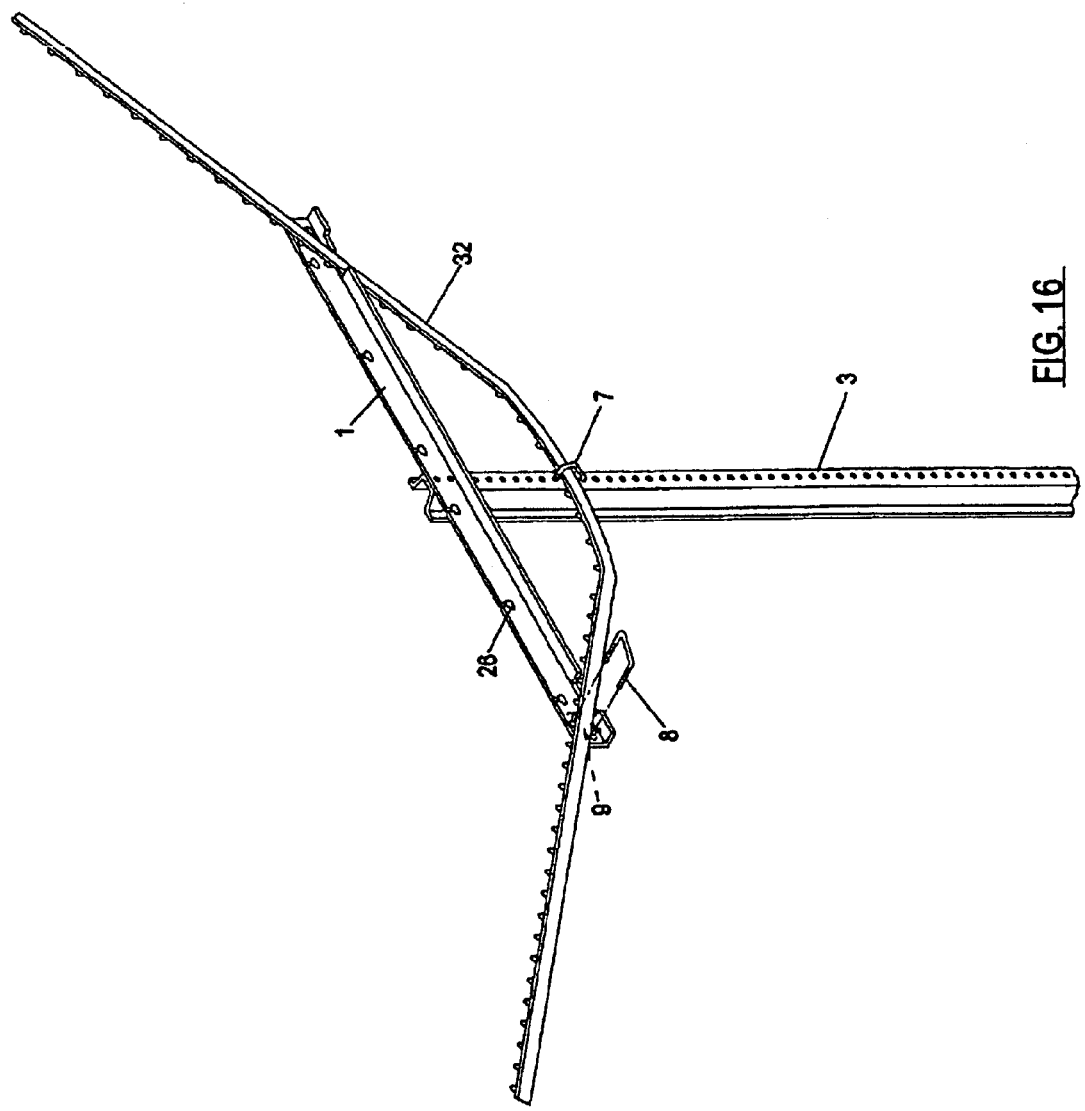
FIG. 16 is a perspective view of the support structure of the present invention installed on a metal post.
Figure 16:
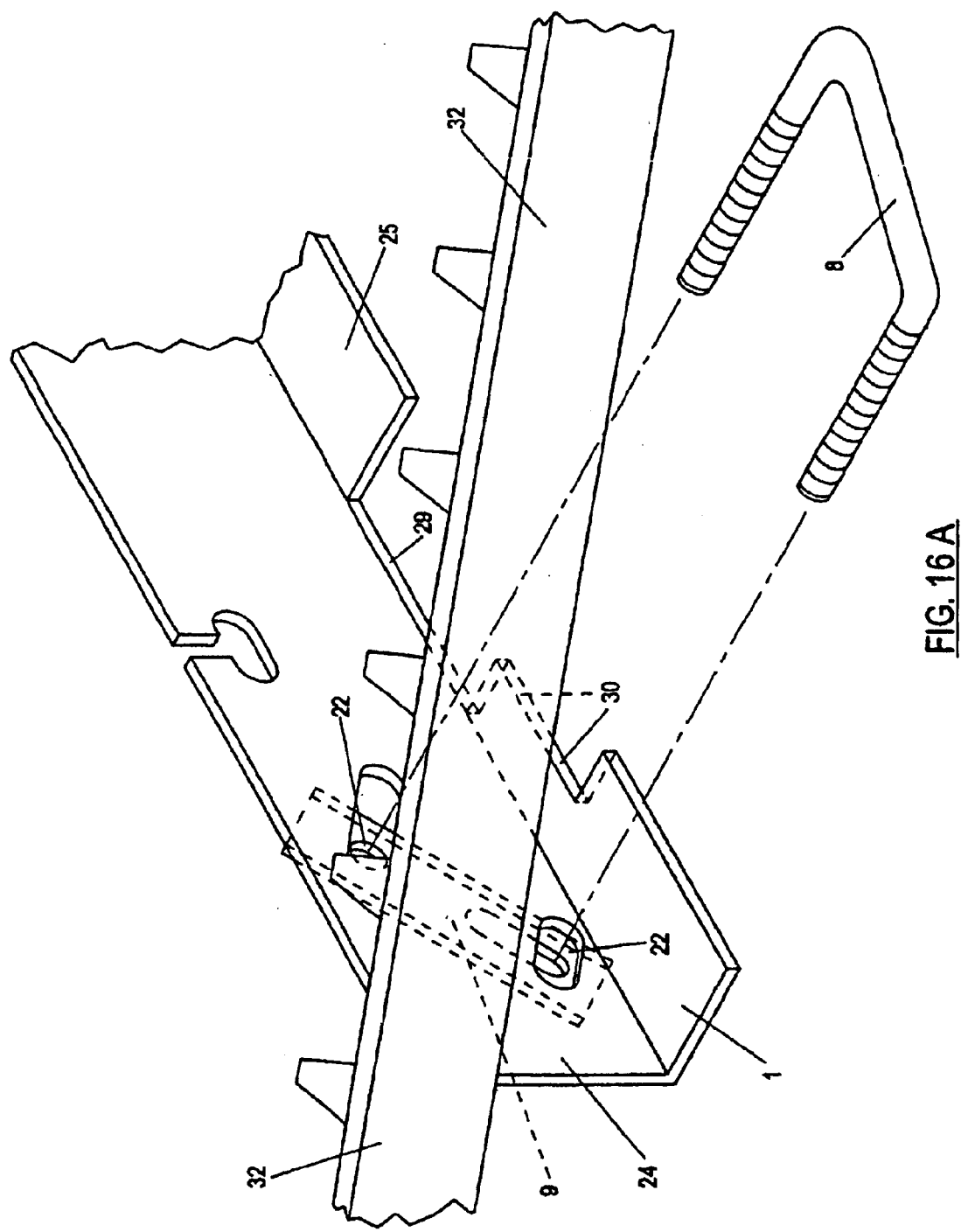

The preferred cross arm has stair-step segments 30 as shown in FIGS. 16 and 16A. The area shown in phantom lines of segment 30 shown in FIG. 16A engages snugly against the inside of the T-stake of arm 32 providing better stability and support. The ends of anchor 8 are passed through openings 22 in flange 24 of the cross arm and attached using bolts 11 with or without back plate 9.

Figure 17:
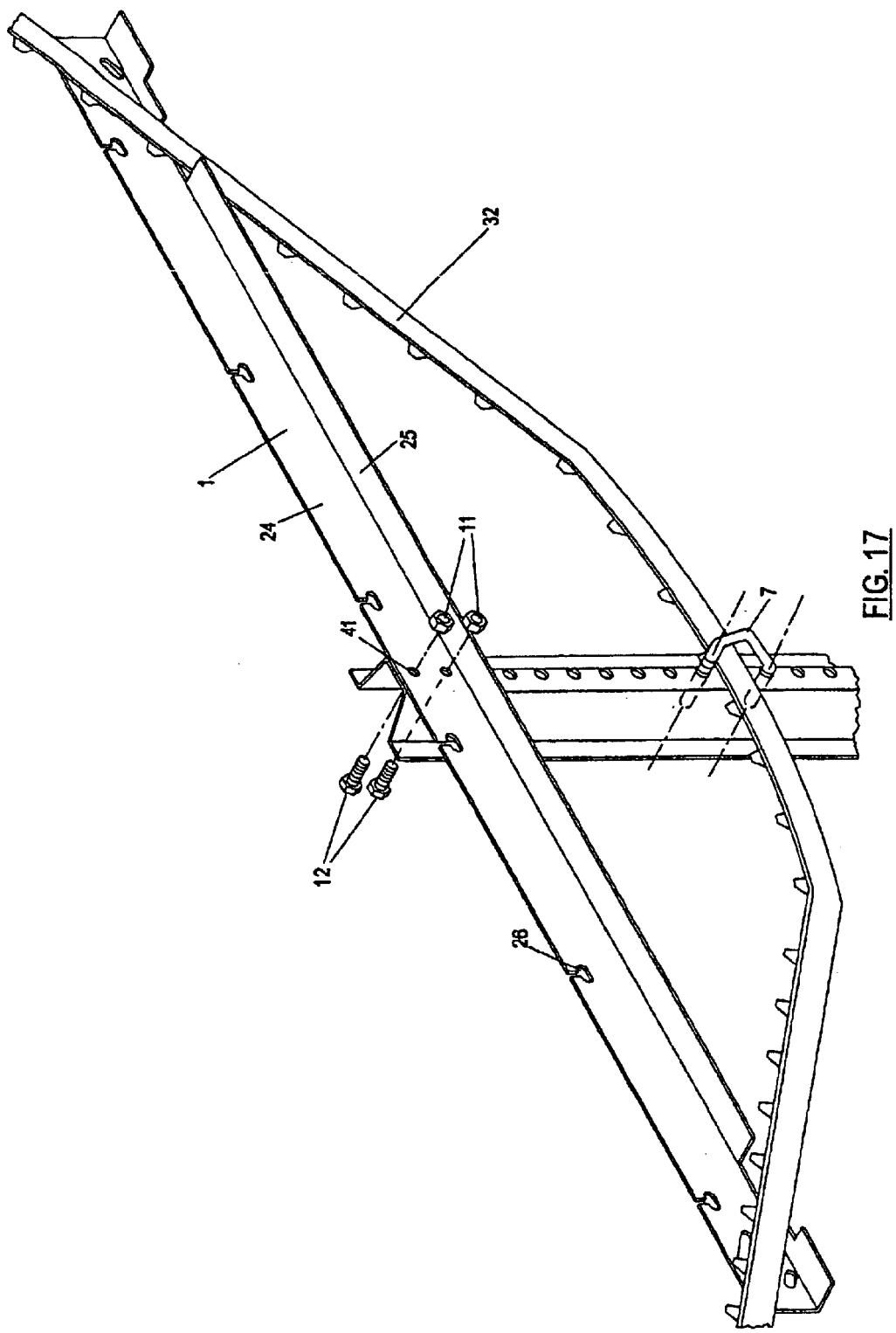
FIG. 17 is a detailed view of FIG. 16.
Figure 20:
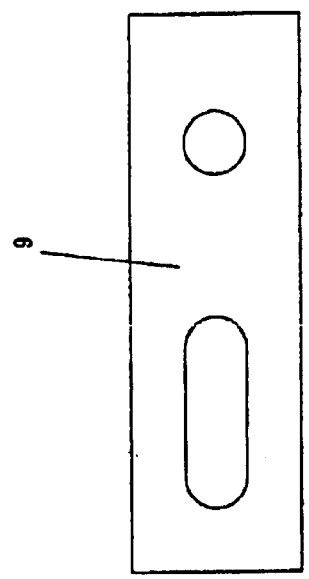
FIG. 20 is a detail view of the back plate for a U-bolt attachment.
Figure 19:
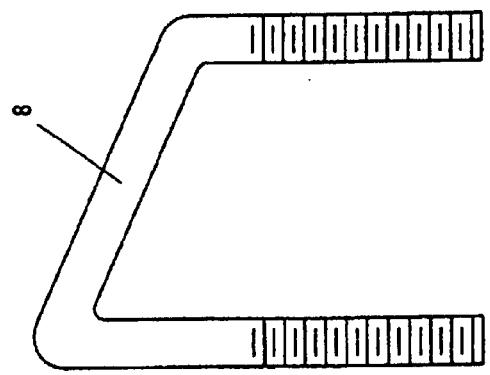
FIG. 19 is a detail view of a U-bolt attachment.
Figure 18:
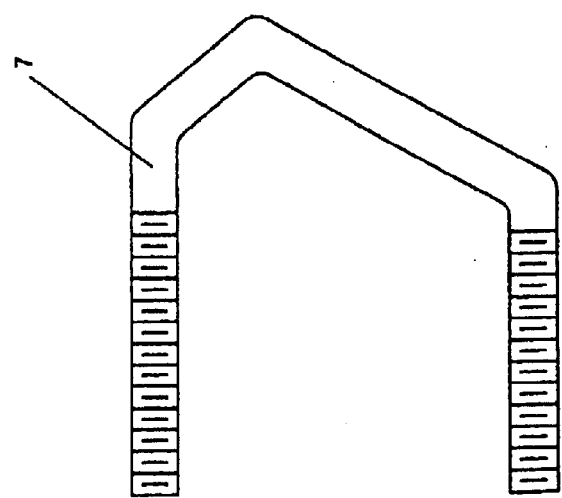
FIG. 18 is a detail view of an offset U-bolt attachment.
Figure 21:
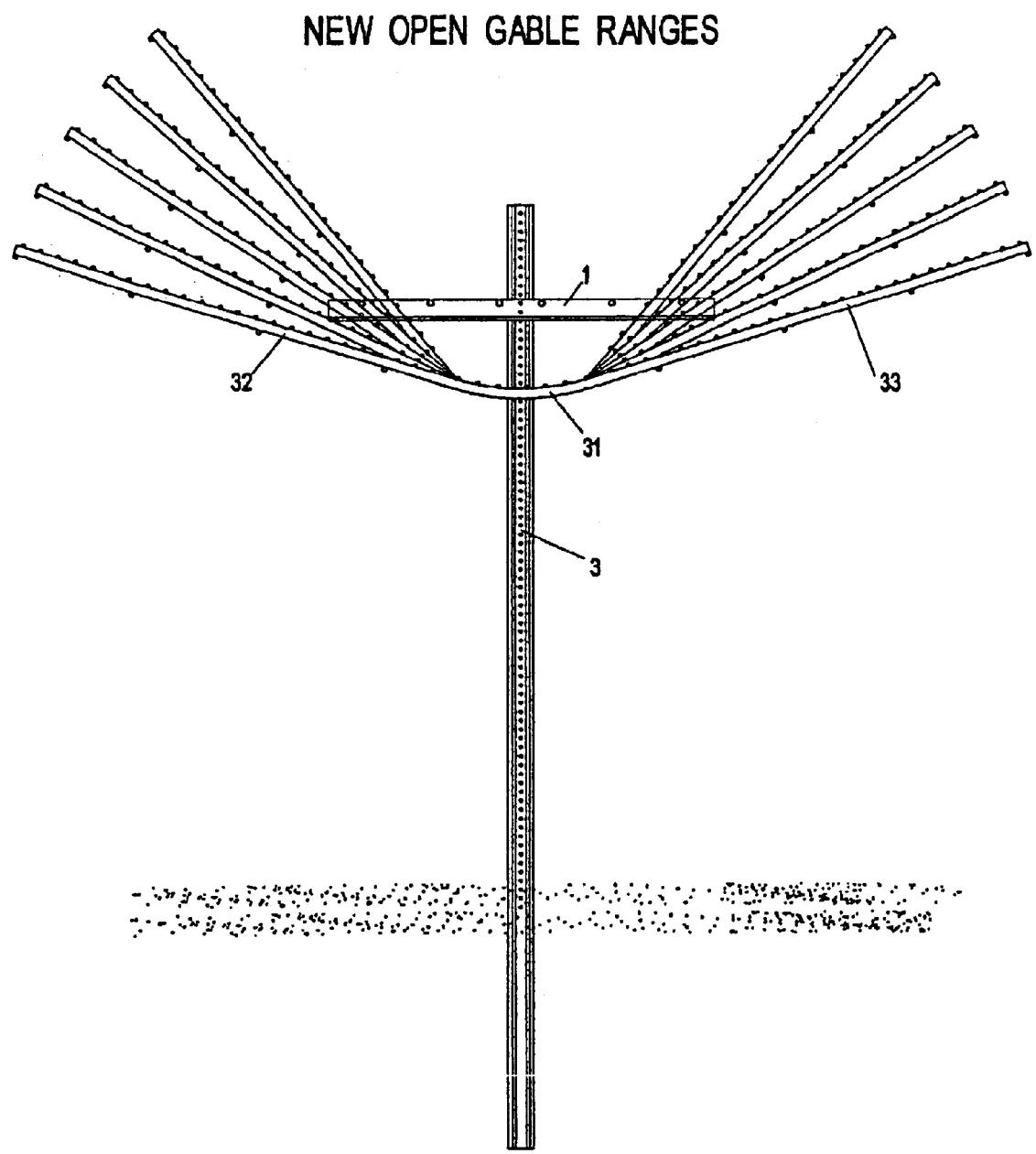
FIG. 21 is a side view showing several different alternative angles for arms of the main support member.
Figure 22:
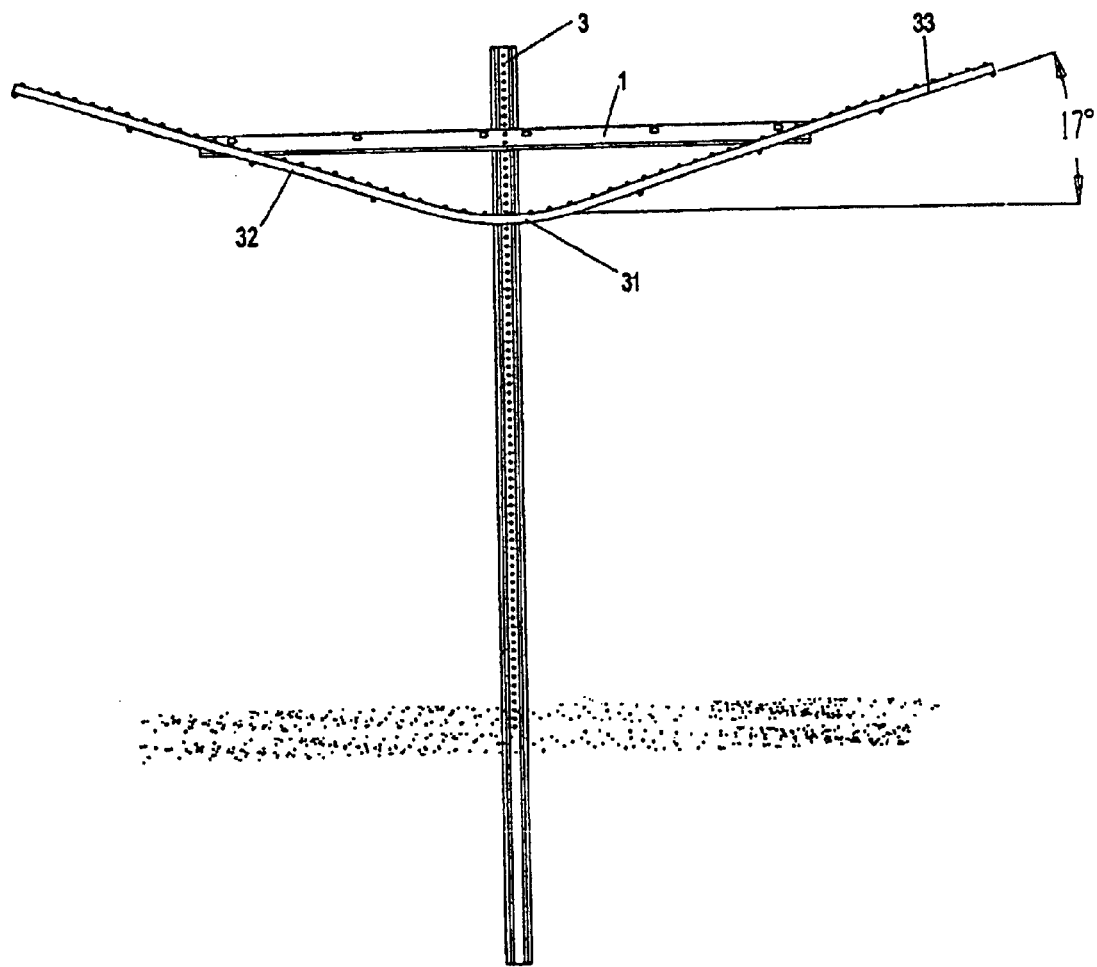
FIG. 22 is a side view showing a 17° angle for the support member arms.
Figure 23:
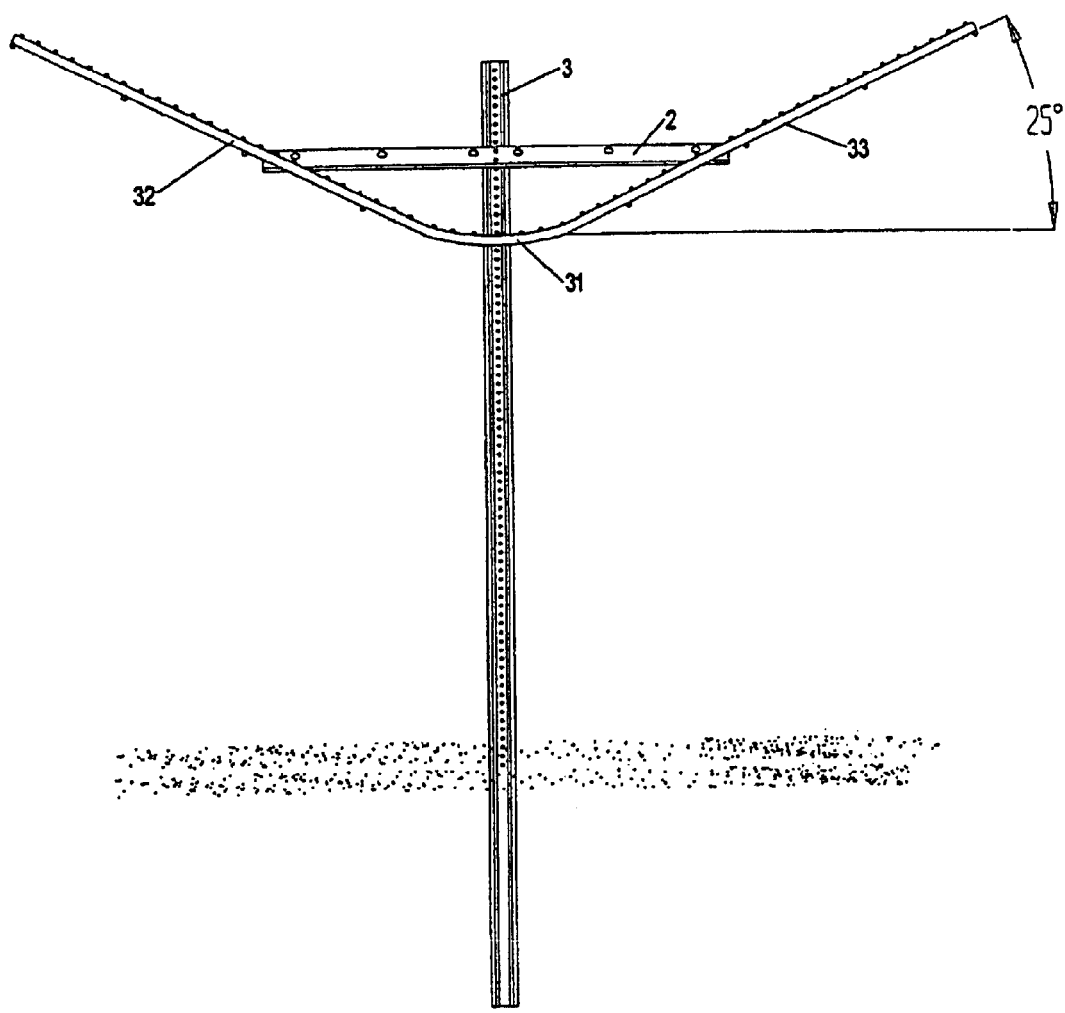
FIG. 23 is a side view showing a 25° angle for the support member arms.
Figure 24:
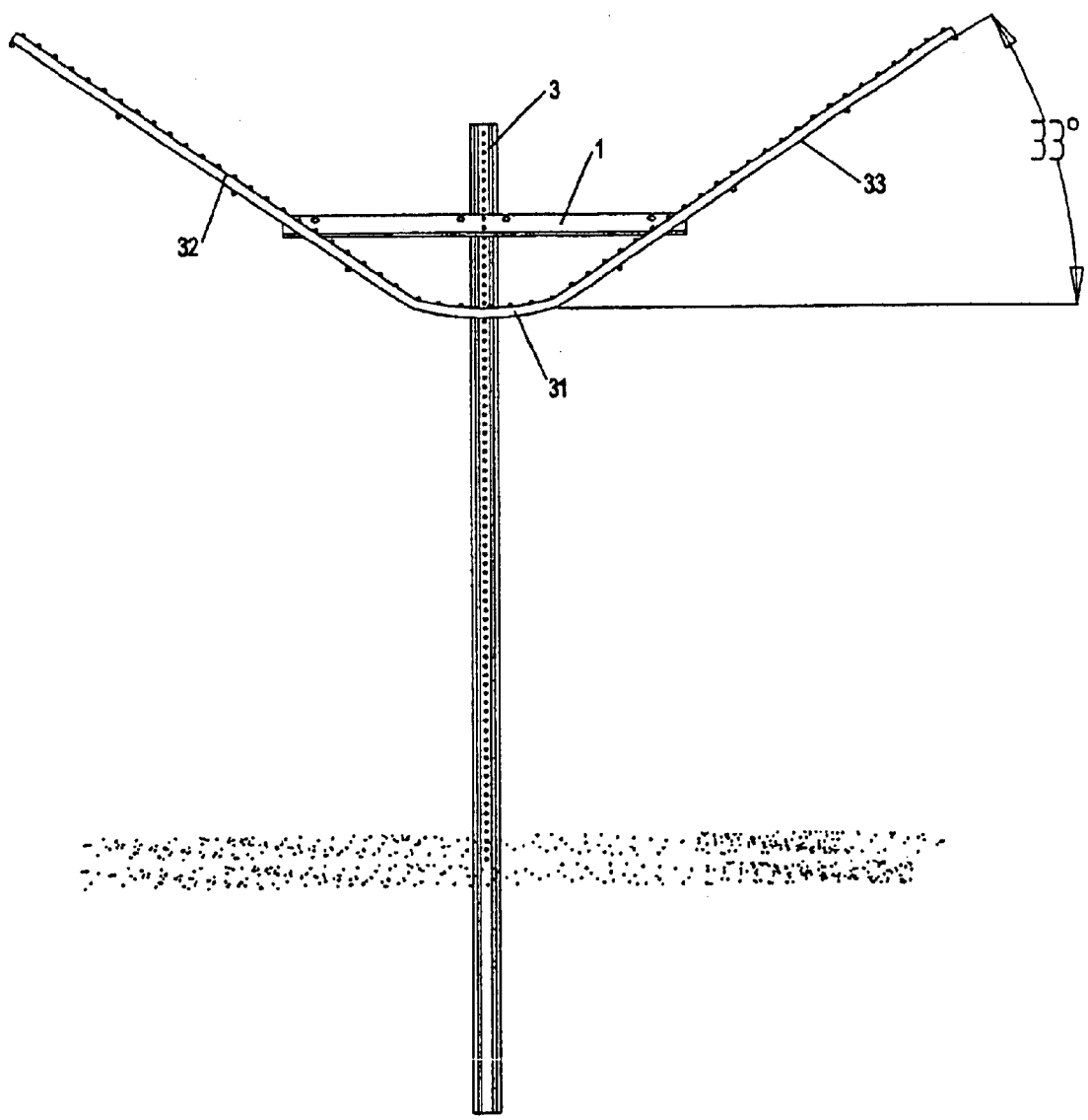
FIG. 24 is a side view showing a 33° angle for the support member arms.
Figure 25:
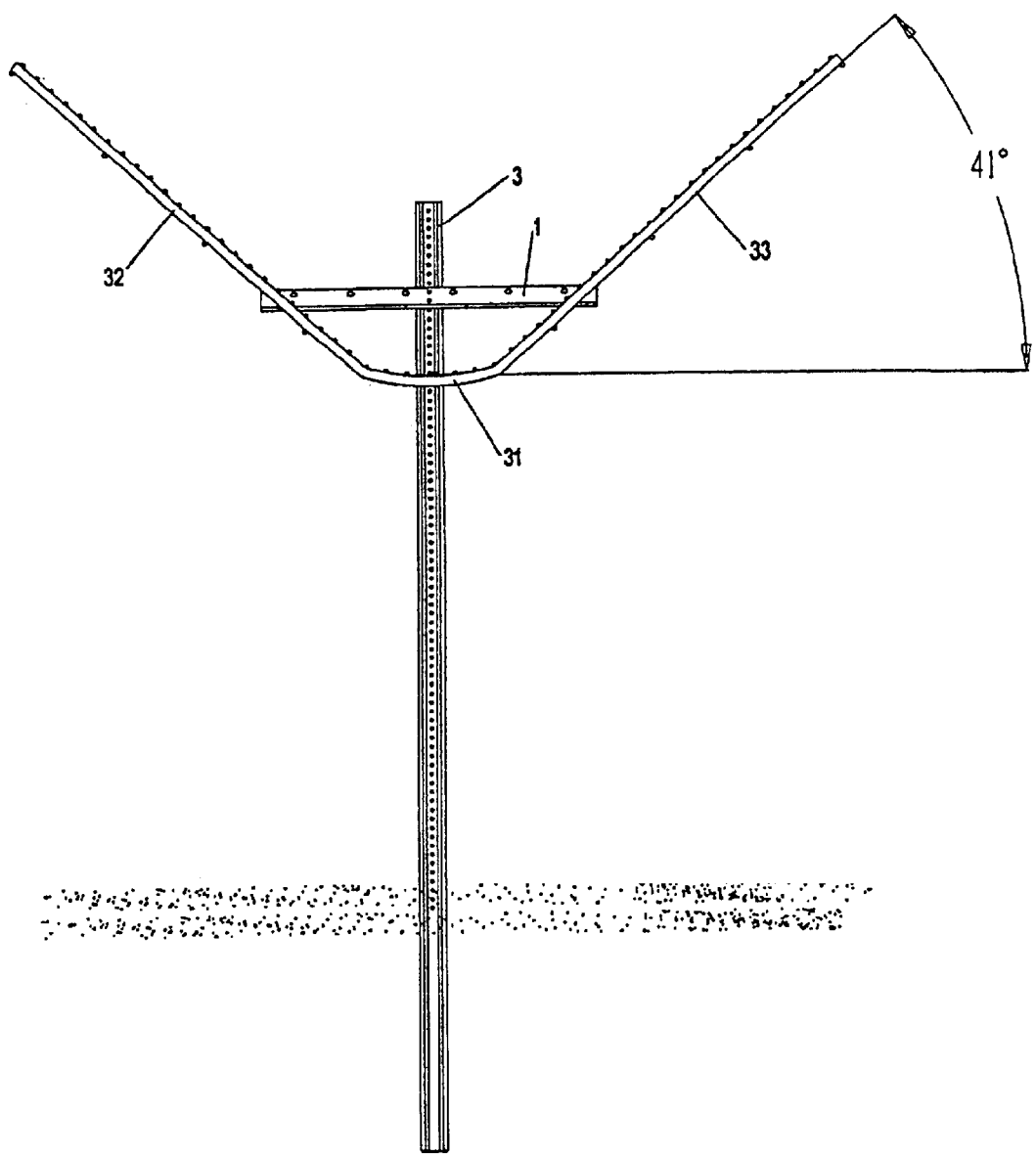
FIG. 25 is a side view showing a 41° angle for the support member arms.
Figure 26:
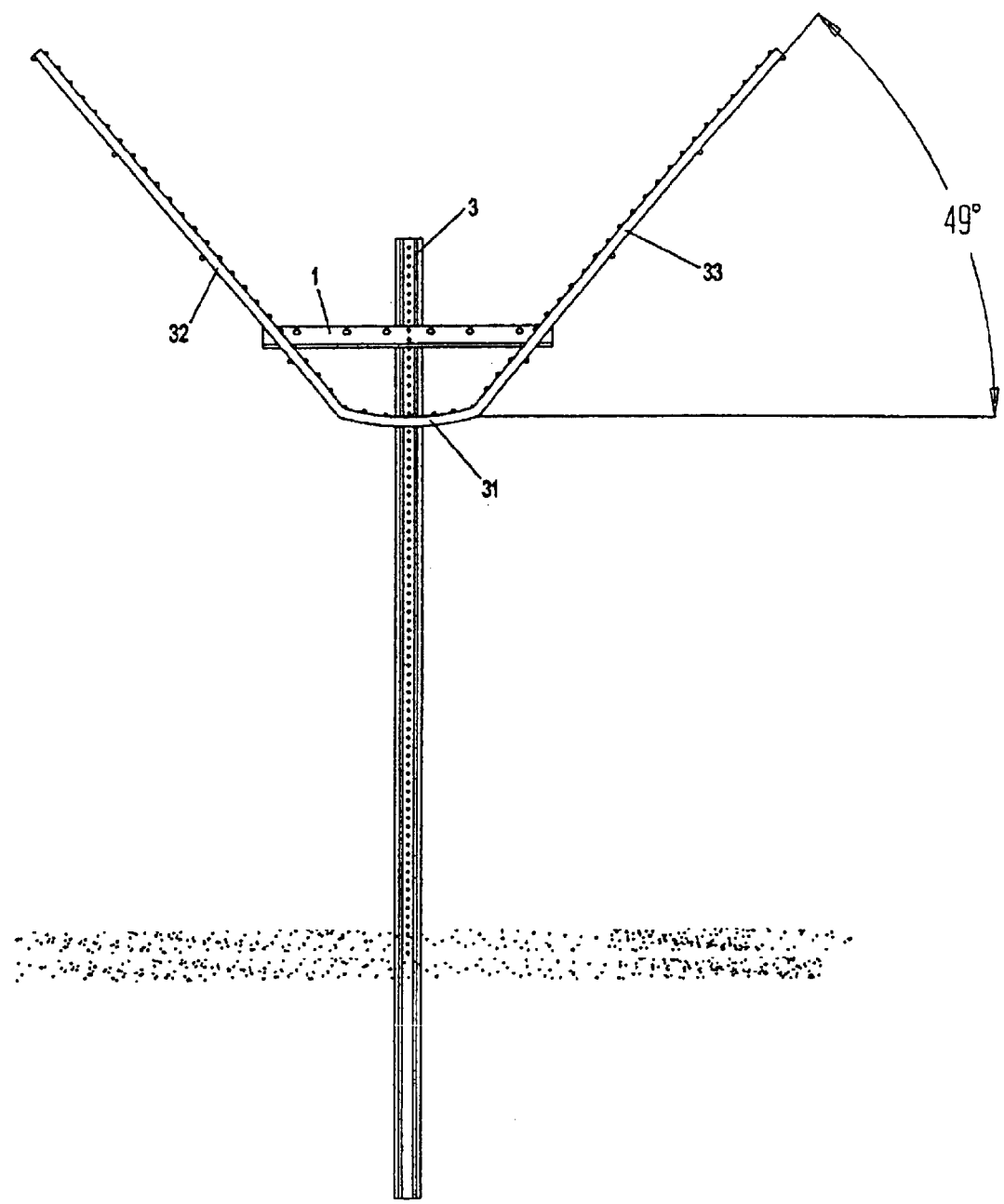
FIG. 26 is a side view showing a 49° angle for the support member arms.

A set of openings 41 are provided at the center of cross arm 1 along flange 24 for attachment to post 3. In the embodiment of FIG. 1, post 3 is made of metal having a plurality of evenly spaced openings running along its length. Attachment of cross arm 1 to post 3 is accomplished using suitable anchors 8 passed through openings 41 and attached to post 3. The preferred embodiment of FIG. 1 reflects the use of V-bolts 4 and nuts 11, although any suitable anchor may be used, such as the bolts 12 illustrated in FIGS. 16–17. It is to be noted that the cross arm need only have one opening 41 for a single bolt 12, although two openings 41 and corresponding bolts 12 with nuts 11 are preferred for better stability. A set of openings 26 provided along flange 24 act as guides for trellis wires strung between the support structures. The lower section 31 of the bent support member is attached to the metal post using an appropriate anchor 8, such as modified U-bolt 7 shown in FIG. 17. The ends of the U-bolt are attached using nuts 11 with or without a back plate 9.

In order to attach flanged cross member 1 to a wooden post 3 as depicted in FIGS. 3, and 13–15, elongated bolts 12 such as carriage bolts are used in conjunction with nuts 11. Bolts 12 pass through wooden post 3 and openings 41 on cross member 1, and are held in place using nuts 11. It is to be noted that the cross arm need only have one opening 41 for bolt 12, although two openings 41 are preferred for better stability. The lower section 31 of the bent support member is attached to the wooden post using an appropriate anchor 8, such as modified J-bolt 6 shown in FIG. 14. One end of the J-bolt is passed through post 3 and held in place using a nut 11. The other end hooks over section 31 holding it firmly against the post.

In an alternative embodiment, cross arm 1 may itself be a studded metal T-stake or other similar structure, as shown in FIGS. 2 and 4. Attachment of the T-stake cross arm to bent arms 32 and 33 is accomplished while member 2 is in the jig using appropriate anchors 8 such as U-bolts 7 with back plates 9 and fastening nuts 11. As with the attachment of cross arm 1 to a metal post 3, any suitable anchor 8 may be used for this purpose. The studs 35 on both the T-stake 1 and on arms 32 and 33 holds anchor 8 in position, preventing slippage. Attaching the T-stake embodiment of the cross arm to a metal post 3 as shown in FIG. 2 is accomplished using V-bolts 4 and nuts 11, although any other suitable anchor may be used. Attaching the T-stake embodiment of the cross arm 1 to a wooden post 3 as shown in FIG. 4 may be accomplished using the J-bolt 6 shown in FIG. 15, although any other suitable anchor may alternatively be used.

Figure 28:
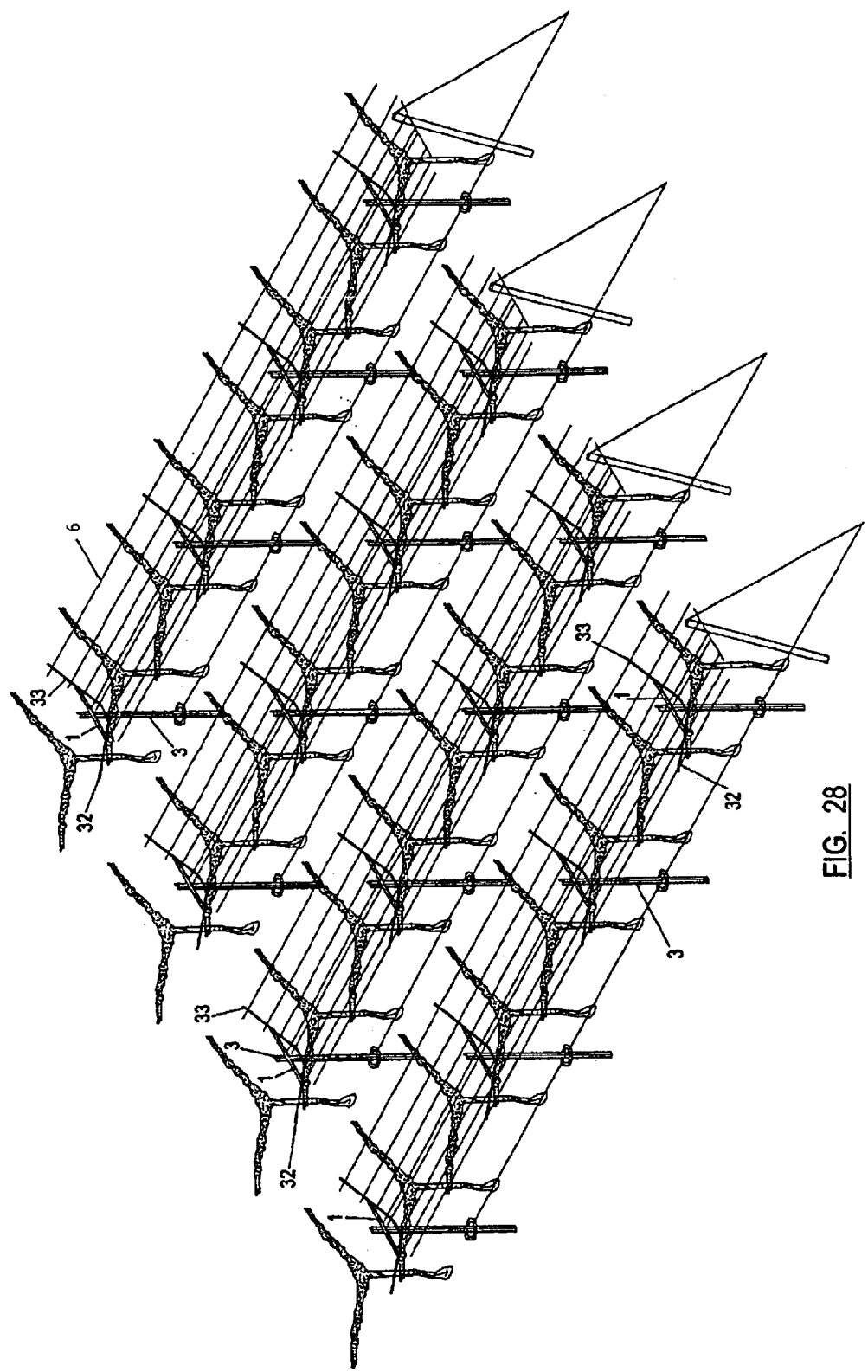
FIG. 28 is a perspective view showing a plurality of the support structures of the present invention installed with wires along rows of agricultural crops.
Figure 29:
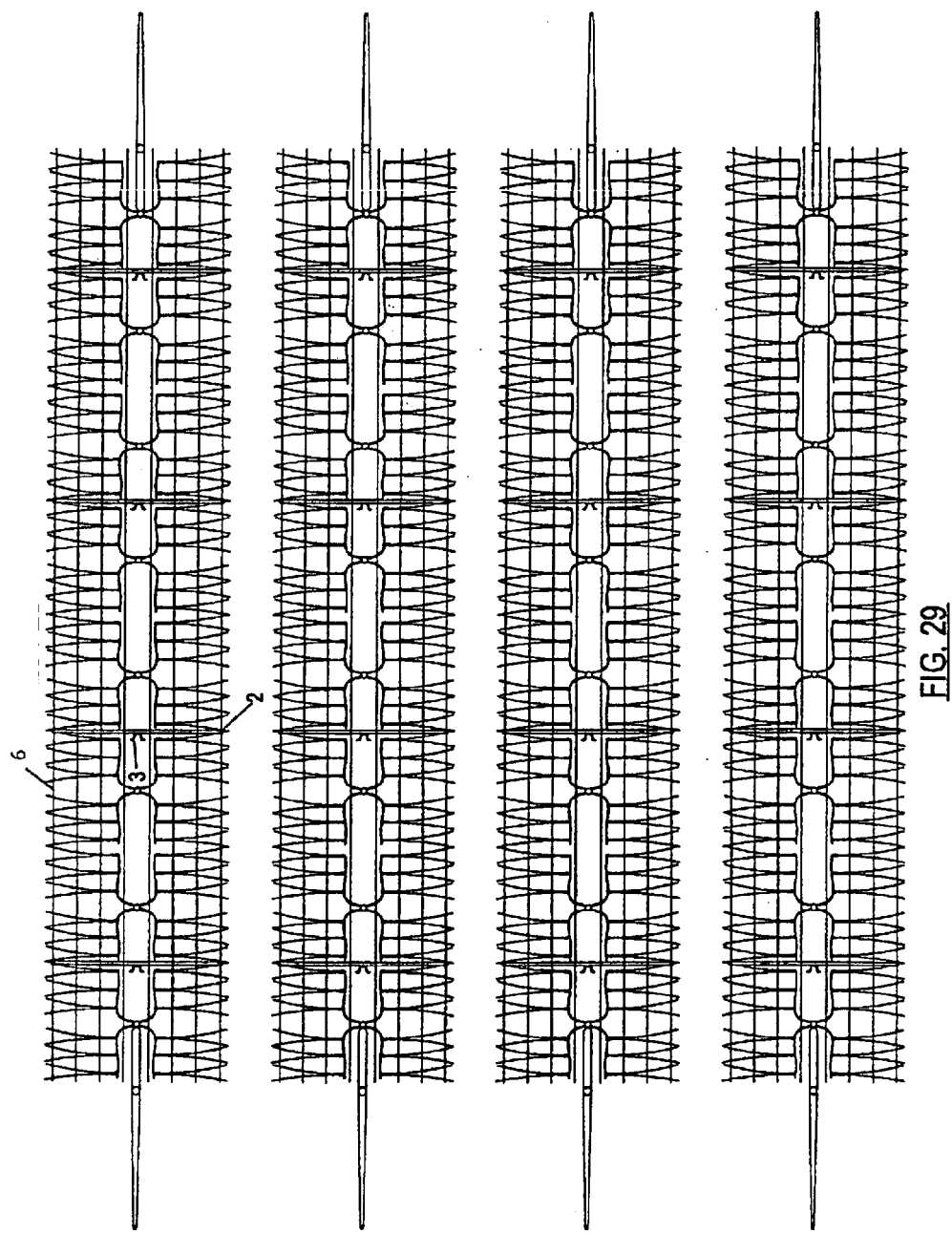
FIG. 29 is a top view of an agricultural field where support structures of the present invention have been installed.

The triangulated support members 2 with attached cross arms 1 may be attached to posts 3 as part of the manufacturing process. Alternatively, attachment to the post may be accomplished in the field, with the support post 3 being buried in the ground, followed by attachment of the triangulated support member 2 with attached cross arm 1. A plurality of completed support structures are deployed in parallel rows in the field as shown in FIGS. 28 and 29.

The support member 2 of the present invention may be provided in any suitable length according to such factors as, without limitation, the requirements of the plants to be trained thereon, the size of the field, the anticipated crop husbandry techniques to be practiced, local weather and climactic conditions, and the like.

Figure 27:
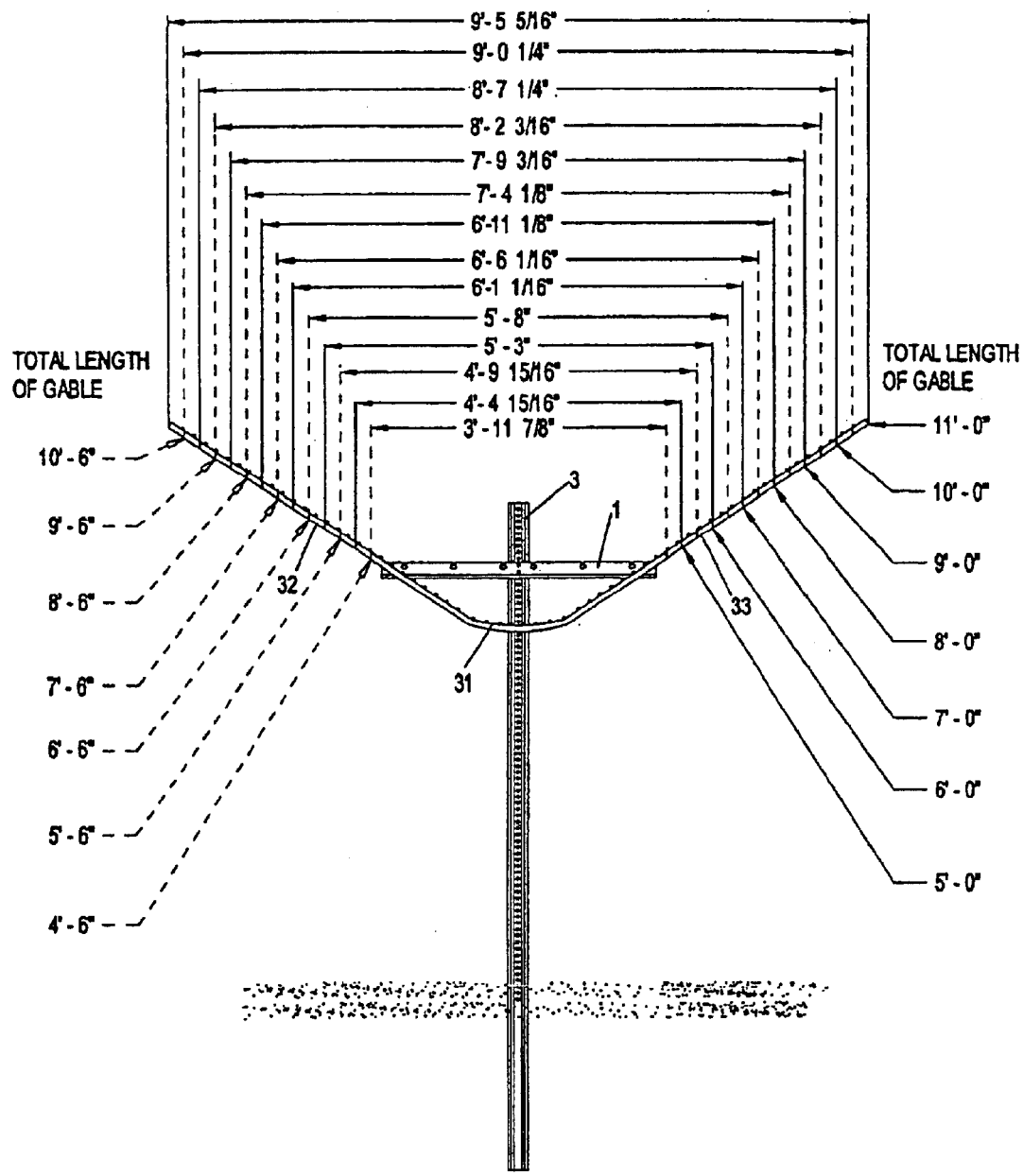
FIG. 27 is a side view showing several different possible lengths for the arms of the main support member.

Different angles of incidence may be established according to the amount of bending that member 2 is subjected to. The length of member 2 and the chosen angle of bending will determine the length of cross member 1. A set of typical angles ranging from 17° to 49° from horizontal for arms 32 and 33 are depicted in FIGS. 21–26. A set of typical lengths for support member 2 (before bending) ranging from four feet six inches (4'–6") to eleven feet (11'), with corresponding lengths for cross member 1 ranging from three feet, eleven and 7/8 inches (3'–11 7/8") to nine feet five and 5/16 inches (9'–5 5/16") are depicted in FIG. 27.

Once installed in a field, a plurality of trellis wires 13 are extended along corresponding interstices of the plurality of completed support structures. Depending upon the variety of grapevine, the horticultural practice preferred and other considerations, any number of trellis wires may be employed and can be spaced as desired within their individual corresponding interstices. A plurality of wire clips 5 are individually clipped about the two arms 32 and 33 to hold their respective trellis wires in the interstice between adjoining studs 35. Additional wires may be threaded through openings 26 in cross arm 1.

When a plurality of the support structures of the present invention are mounted in the manner described extending upwardly from within each row, the trellis wires 13 are available to support the pendent portions, or canes, and foliage and crop of grapevines grown in the row. The particular variety of grapevine, spacing in the row and the like are not part of the present invention and therefore are not described. Any arrangement of grapevines can be employed and trained in accordance with the horticultural practices desired. However, it will be apparent that the strength of the bent support arms 2 constructed of the studded T-stakes previously described, is substantially greater than has heretofore been possible. The particular angle to which member 2 is bent at the central portion 31 is dependent entirely upon the particular horticultural practice preferred. The number of trellis wires 13 employed in the row using the support structures of the present invention is purely dependent upon the particular horticultural practices preferred.

It is to be understood that the number of trellis wires 13 employed can be changed, if desired, over time. Removal of existing trellis wires is achieved simply by removing the wire clips 5. The addition of trellis wires is achieved by tensioning the new trellis wires in predetermined interstices of the support structures in accordance with the preferences involved. This can, if desired, or necessary, be performed in a single growing season either to replace broken trellis wires or to modify the particular horticultural practice. Such readjustment, or maintenance, in no way compromises the integrity of the support structures forming the row in view of the superior strength achieved thereby.

Moreover, the low cost of the components comprising each support structure ensures that while the support apparatuses forming the row are of superior strength, they are also of substantially reduced cost, including initial purchase price, installation and maintenance.

Accordingly, the support structure of the present invention has application to a wide variety of environments; it is particularly well suited to the raising of vine borne crops, such as grapevines, on a large commercial scale; it can be installed at minimal expense and yet is of a strength and durability not heretofore achieved in the art; and it can be easily installed and maintained.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

What is claimed is:

1. A support structure for growing plants comprising:
   a. a one-piece elongated metallic support member that has been bent into a modified U-shape forming a slightly arcuate central section and two support arms that extend out at an angle relative to each other;
   b. a metallic cross arm extending between and attached to each of said support arms and to a support post perpendicularly attached to the center of said cross arm and to the central section of said support member wherein said cross arm is in the form of a steel member comprising two flat elongated flanges perpendicularly attached to each other such that said member forms an L-shaped rail having a first flange positioned perpendicular to the longitudinal axis of the support post and a second flange positioned parallel to the longitudinal axis of the support post, and wherein a pair of unsegmented cut out sections are provided along the same outside edge of the first of said elongated flanges at opposite ends thereof for snug engagement against each of the two arms of said support member, the cross arm thus receiving the direct transfer of weight from said support arms.

2. The support structure of claim 1 wherein said support member is a bent metallic studded T-post, and each of the notches in said cross arm includes a stair-step segment for snug engagement against the corresponding stair stepped cross section of each of the support arms of said bent T-post.

3. The support structure of claim 2 wherein two pairs of openings are provided in said cross arm on the second of said elongated flanges, each pair of openings being in the vicinity of one of said notches, the openings of each pair being elongated, and the major axis of the openings of each pair being generally parallel to that of the support arm engaged in each respective notch.

4. The support structure of claim 3 wherein a pair of anchors are provided for securely holding said cross arm against each of said supporting arms, each anchor having a pair of legs for insertion into one of said pairs of parallel openings.

5. A structure for supporting growing plants comprising:
   a. a metallic T-post that has been bent into a modified U-shape forming a support member having an arcuate central section and two support arms that extend outward at an angle relative to each other;
   b. a metallic cross arm extending between and attached to each of said arms wherein said cross arm has a pair of notched recesses on an edge thereof, each of said recesses having a stair-step segment corresponding to the cross-sectional T-post shape of said support member for snug engagement against the arms thereof; and
   c. a support post perpendicularly attached to the center of said cross arm, and also attached to the central section of said U-shaped support member.

6. The structure of claim 5 wherein said cross arm is in the form of a steel member having two flat elongated flanges perpendicularly attached to each other such that said member has an L-shaped cross section.

7. The structure of claim 6 wherein said notched recesses are provided on a first elongated flange of said cross arm, a first pair of openings is provided in said cross arm on the second of said elongated flanges in the vicinity of one of said notches, and a second pair of openings is provided in said cross arm on the second of said elongated flanges in the vicinity of the other of said notches, the openings of each pair having an oval shape, the major axis of the openings of each pair being generally parallel to that of the support arm engaged in each of the respective notches.

8. The structure of claim 5 wherein the distance between the ends of said two support arms is at least six feet.

9. A structure for supporting growing plants comprising:
   a. a metallic T-post that has been bent into a modified U-shape forming a support member having an arcuate central section and two support arms that extend outward at an angle relative to each other;
   b. a metallic cross arm having a pair of notches therein, said cross arm extending between and attached to each of said support arms at each of said notches wherein the distance between ends of said support arms is at least six feet;
   c. a support post perpendicularly attached to the center of said cross arm and also to the central section of said U-shaped support member wherein said notches are located in a flange perpendicular to the longitudinal axis of said support post, and wherein two pairs of openings are provided in said cross arm, each pair of openings being in the vicinity of one of said notches, the openings of each pair being elongated, and the major axis of the openings of each pair being generally parallel to that of the support arm engaged in each respective notch.

10. A support structure for growing plants comprising:
    a. a one-piece elongated metal support member that has been formed into a modified U-shape wherein the two extensions of the U serve as support arms that extend out at an angle relative to each other;
    b. a metallic cross member extending between and attached to each of said support arms, said cross member having two notches located at opposite ends thereof, each of said notches having substantially the same shape as the cross-section of the corresponding support arm;
    c. a support post perpendicularly attached to the center of said cross member between said support arms, and also attached to the central section of said support member wherein said notches are located in a flange perpendicular to the longitudinal axis of said support post and wherein a portion of each notch is extended to the edge of the cross member to permit acceptance into each notch of its corresponding support arm.

11. The support structure of claim 10 wherein said cross member is in the form of a steel member comprising two flat elongated flanges perpendicularly attached to each other such that said member forms an L-shape with said notches being located at opposite ends thereof along an edge of the first of said elongated flanges.

12. The support structure of claim 10 wherein said cross member is in the form of a metallic T-post with said notches being located at opposite ends thereof along an edge of the T-post that is perpendicular to said support arms.

13. The support structure of claim 10 wherein said support member is a bent metallic studded T-post.

14. The support structure of claim 10 wherein said support member is a bent metallic studded L-shaped post.

15. The support structure of claim 10 wherein pairs of openings are provided in said cross member at opposite ends thereof in the vicinity of said notches, the openings of each pair having an oval shape, the major axis of the openings of each pair being generally parallel to that of the support arm engaged in each of the respective notches.

16. The structure of claim 10 wherein the distance between the ends of said two support arms is at least six feet.

17. A support structure for growing plants comprising:
   a. a one-piece elongated metal support member that has been formed into a modified U-shape in which the two legs of the U serve as support arms that extend out at an angle relative to each other;
   b. a metallic cross arm extending between and attached to each of said support arms, said cross arm having a notch near one end thereof and another notch near the opposite end wherein each such notch has substantially the same shape as the cross-section of the corresponding support arm, and wherein a portion of each such notch is extended to the edge of the cross-arm to permit acceptance into such notch of said corresponding support arm; and
   c. a support post perpendicularly attached to the center of said cross arm between said support arms, and also attached to the central section of said support member wherein said notches are located in a flange perpendicular to the longitudinal axis of said support post.

18. The support structure of claim 17 wherein said cross arm is in the form of a steel member comprising two flat elongated flanges perpendicularly attached to each other such that said member forms an L-shape with said notches being located at opposite ends thereof along an edge of the first of said elongated flanges.

19. The support structure of claim 17 wherein said cross arm is in the form of a metallic T-post with said notches being located at opposite ends thereof along an edge of the T-post perpendicular to said support arms.

20. The support structure of claim 17 wherein said support member is a bent metallic studded T-post.

21. The support structure of claim 17 wherein said support member is a bent metallic studded L-shaped post.

22. The support structure of claim 17 wherein pairs of openings are provided in said cross arm at opposite ends thereof in the vicinity of said notch and said opening, the openings of each pair having an oval shape, the major axis of the openings of each pair being generally parallel to that of the support arm engaged in the respective notch and opening.

23. The structure of claim 17 wherein the distance between the ends of said two support arms is at least six feet.

* * * * *